United States Patent
Brandau et al.

(10) Patent No.: US 10,597,467 B2
(45) Date of Patent: Mar. 24, 2020

(54) CROSS-LINKING AGENTS CONTAINING ISOCYANATE GROUPS FOR NITRILE RUBBERS

(75) Inventors: Sven Brandau, Köln (DE); Michael Klimpel, Langenfeld (DE); Hans Magg, Kurten (DE)

(73) Assignee: ARLANXEO DEUTSCHLAND GMBH, Dormagen (DE)

( * ) Notice: Subject to any disclaimer, the term of this patent is extended or adjusted under 35 U.S.C. 154(b) by 289 days.

(21) Appl. No.: 13/640,775

(22) PCT Filed: Apr. 15, 2011

(86) PCT No.: PCT/EP2011/056038
§ 371 (c)(1),
(2), (4) Date: May 24, 2013

(87) PCT Pub. No.: WO2011/141275
PCT Pub. Date: Nov. 17, 2011

(65) Prior Publication Data
US 2013/0237667 A1   Sep. 12, 2013

(30) Foreign Application Priority Data

Apr. 15, 2010 (EP) .................................... 10290204

(51) Int. Cl.
*C08C 19/22* (2006.01)
*C08C 19/38* (2006.01)
*C08K 5/34* (2006.01)
*C08K 5/29* (2006.01)

(52) U.S. Cl.
CPC .............. *C08C 19/22* (2013.01); *C08C 19/38* (2013.01); *C08K 5/29* (2013.01); *C08K 5/34* (2013.01)

(58) Field of Classification Search
CPC . C08C 19/22; C08C 19/38; C08L 9/02; C08L 15/005; C08K 5/0025; C08K 5/16; C08K 5/21; C08K 5/34; C08K 5/3462; C08K 5/3442; C08K 5/3477; C08K 5/357; C08J 3/24
See application file for complete search history.

(56) References Cited

U.S. PATENT DOCUMENTS

| | | | |
|---|---|---|---|
| 3,700,637 A | 10/1972 | Finch | |
| 3,950,238 A * | 4/1976 | Eldred | C08F 8/00 522/121 |
| 4,412,013 A * | 10/1983 | Chang | 521/121 |
| 4,631,315 A | 12/1986 | Buding et al. | |
| 4,795,788 A | 1/1989 | Himmler et al. | |
| 4,812,528 A | 3/1989 | Rempel et al. | |
| 4,978,771 A | 12/1990 | Fiedler et al. | |
| 6,399,706 B1 | 6/2002 | Obrecht et al. | |
| 6,548,604 B1 | 4/2003 | Kotsuji et al. | |
| 6,709,758 B2 | 3/2004 | Halladay et al. | |
| 7,183,354 B2 | 2/2007 | Halladay et al. | |
| 7,220,487 B2 | 5/2007 | Halladay | |
| 2004/0059082 A1 | 3/2004 | Laas et al. | |
| 2004/0068036 A1 * | 4/2004 | Halladay et al. | 524/439 |
| 2005/0267255 A1 | 12/2005 | Ganster et al. | |
| 2007/0135608 A1 | 6/2007 | Hannig et al. | |
| 2007/0160797 A1 | 7/2007 | Halladay | |

FOREIGN PATENT DOCUMENTS

| | | |
|---|---|---|
| EP | 0471250 A1 | 2/1992 |
| GB | 1558491 A1 | 3/1977 |
| JP | 55151017 A2 | 11/1980 |
| JP | 63095242 A2 | 4/1988 |
| JP | 2007031631 A2 | 2/2007 |

OTHER PUBLICATIONS

European Search Report from co-pending Application EP10290204, dated Jul. 22, 2010, 2 pages.
Polymer Preprints, American Chemical Society, 2003, 44(1), pp. 46-47.
Wicks, Z.W. Jr., "Blocked Isocyanates, Progress in Organic Coatings", 1975, 3, pp. 73-99.
Wicks, D.A. "Blocked Isocyanates III, Part A, Mechanism and Chemistry", 1999, 36, pp. 148-172.
Ullmann's Encyclopedia of Industrial Chemistry VCH Verlagsgsellschaft MbH, 1993, vol. A 23 "Chemicals and Additives", pp. 366-417.
Ullmann's Encyclopedia of Industrial Chemistry, "Rubber 4, Chemicals and Additives" vol. A23, 1993, VCH Verlagsgsellschaft GmbH, Weinheim, Germany, pp. 365-420.

* cited by examiner

*Primary Examiner* — Roberto Rabago
(74) *Attorney, Agent, or Firm* — Norris McLaughlin P.A.

(57) ABSTRACT

By the use of special cross-linkers that contain at least two isocyanate groups, hydroxyl group-containing optionally hydrogenated nitrile rubber polymers can be successfully cross-linked. Preferred cross-linkers contain allophanate, biuret, uretdione, uretonimine, bridged carbamate, carbodiimide, isocyanurate, iminooxadiazinedione or oxadiazinetrione structural elements.

14 Claims, 1 Drawing Sheet

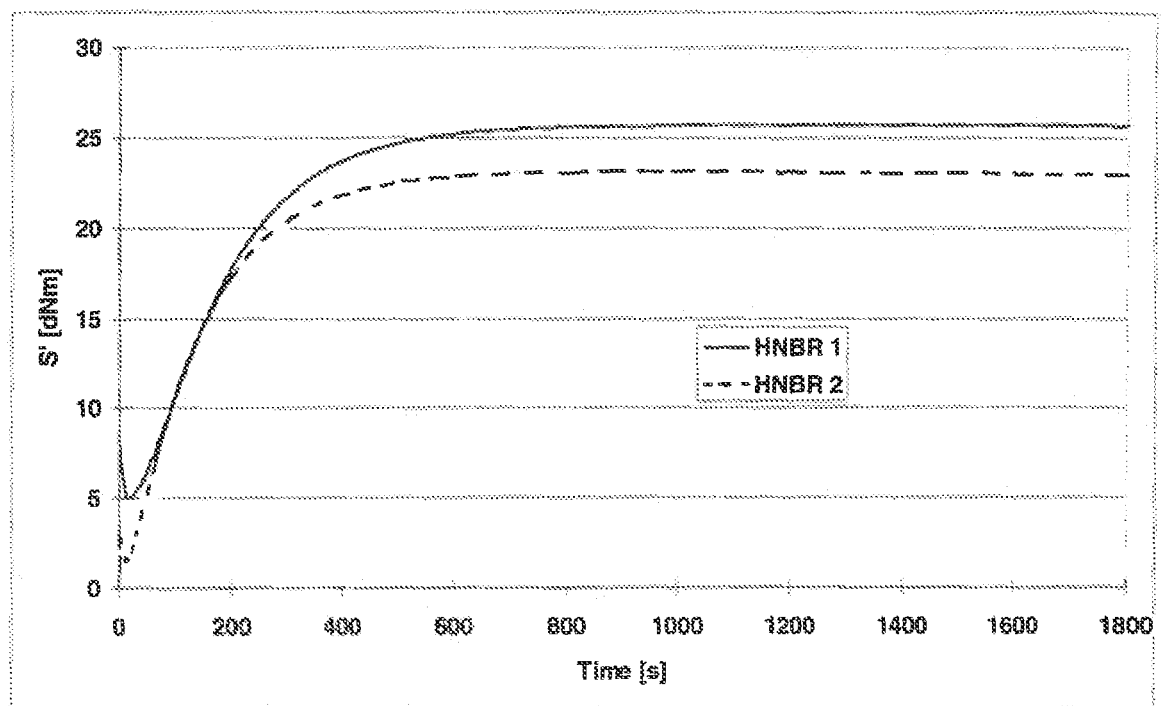

CROSS-LINKING AGENTS CONTAINING ISOCYANATE GROUPS FOR NITRILE RUBBERS

The invention relates to the use of special compounds containing at least two isocyanate groups as cross-linkers for hydroxyl group-containing (H)NBR rubbers, corresponding vulcanizable compositions, processes for their production, processes for the production of vulcanizates therefrom and the vulcanizates thus obtained, and to hydroxyl group-containing HNBR rubbers.

Nitrile rubbers, also designated as "NBR", are understood as meaning rubbers which are co- or terpolymers of at least one $\alpha,\beta$-unsaturated nitrile, at least one conjugated diene and optionally one or more other copolymerizable monomers. Hydrogenated nitrile rubbers ("HNBR") are understood as meaning corresponding co- or terpolymers, in which the C=C double bonds of the copolymerized diene units are completely or partially hydrogenated. The designation (H)NBR comprises both NBR and HNBR.

Both NBR and HNBR have for many years occupied a permanent place in the field of special elastomers. They have an excellent property profile in the form of excellent oil resistance, good heat resistance, outstanding resistance to ozone and chemicals, where the latter in the case of HNBR are even more pronounced than with NBR. NBR and HNBR further have very good mechanical and application technology properties. For this reason, they find wide use in all sorts of application areas and are employed, for example, for the production of seals, tubes, belts and damping elements in the automobile sector, furthermore for stators, borehole seals and valve seals in the field of oil production, and also for numerous parts of the electrical industry, engineering and shipbuilding. A large number of different types are commercially obtainable, which are distinguished, according to the application area, by different monomers, molecular weights, polydispersities, and mechanical and physical properties. In addition to the standard types, there are particularly special types, which are increasingly demanded as a result of contents of special termonomers or particular functionalizations.

In practical use of the (H)NBR rubbers, the vulcanization of the rubbers, i.e. especially the cross-linker system and the vulcanization conditions, also have growing importance here. Thus, in addition to the conventional rubber cross-linking systems based on peroxides or sulphur existing for many decades, in recent years various new concepts for alternative cross-linking have been developed. Such cross-linking concepts also include polymers that, on account of functional groups, are not accessible to all cross-linking forms and agents and therefore pose a special challenge.

Industrially, nitrile rubbers are produced almost exclusively by "emulsion polymerization". For the control of the molecular weight and thus also of the viscosity of the resulting nitrile rubber, dodecylmercaptans, especially tertiary dodecylmercaptans ("TDDM") are generally employed here. After the polymerization, the NBR latex obtained is coagulated in a first step and the NBR solid is isolated therefrom. If a continuing hydrogenation of the nitrile rubber to the HNBR is desired, this hydrogenation is likewise carried out according to known methods of the prior art, for example using homogeneous or alternatively heterogeneous hydrogenation catalysts. The catalysts are customarily based on rhodium, ruthenium or titanium. However, platinum, iridium, palladium, rhenium, ruthenium, osmium, cobalt or copper, either as a metal or else preferably in the form of metal compounds, can also be employed.

On the industrial scale, such hydrogenation reactions of NBR to HNBR are customarily carried out in homogeneous phase, i.e. in an organic solvent. Suitable catalysts and solvents for this are known, for example, from DE-A 25 39 132 and EP-A 0 471 250. The "Wilkinson catalyst" in monochlorobenzene as an organic solvent has especially proven suitable for a selective hydrogenation of the nitrile rubbers. To carry out this hydrogenation in an organic medium, the nitrile rubber obtained in aqueous emulsion after the polymerization must thus be isolated first. This is complicated in terms of process technology and apparatus and thus also not unrestrictively attractive economically.

Added to this, in the course of the hydrogenation of nitrile rubbers a very considerable increase in viscosity (customarily by a factor of 2 or more) is to be observed (the "Mooney jump"). For this reason, before the hydrogenation nitrile rubbers in certain circumstances must be subjected in a further step to a molecular weight degradation (e.g. by metathesis) to finally be able to obtain a hydrogenated nitrile rubber with not too high a molecular weight, or not too high a viscosity. Limits are also placed to a certain extent on the possibilities for influencing the polydispersity in the previously known and industrially transferable synthesis routes.

The cross-linkage of hydroxyl group-containing nitrile rubbers with diisocyanates is known per se. U.S. Pat. No. 3,551,472 relates to liquid hydroxyl-terminated NBR rubbers. Here, carboxyl-terminated NBR rubbers are firstly prepared, which are subsequently reacted with excess 1,4-butanediol. The rubber obtained can be further reacted with monomeric toluene diisocyanate and should have advantageous adhesive properties.

JP 55-151017, applied for on May 15, 1979 (application number 54-56800), relates to a nitrile rubber that contains hydroxyl groups. It is described that this rubber can be cross-linked with monomeric diisocyanates. Dibutyltin dilaurate is employed here, for example, in the cross-linkage with 2,4-tolylene diisocyanate as a catalyst.

The use of tin-containing catalyst leads to a heavy metal loading of the nitrile rubber and makes the handling of the rubber composition significantly more difficult.

The monomeric diisocyanates employed can only be processed, or incorporated into the nitrile rubber compositions, with difficulty on account of their low vapour pressure and their low functionality.

In WO-A-2003/076537, liquid coating compositions are described that can be cross-linked at room temperature and are based on a film-forming polymer having a glass transition temperature Tg <0° C. and containing less than 10% of ethylenic unsaturation. Coating compositions are generally disclosed that contain (A) a carboxylated, hydrogenated acrylonitrile-butadiene copolymer (X-HNBR), (B) a cross-linker containing at least one isocyanate group and a group forming further cross-linking sites and (C) a solvent. Coating compositions are disclosed that have a solids content of 3-30% by weight of a) the carboxylated, hydrogenated copolymer containing repeating units of a conjugated diene, of an unsaturated nitrile and a carboxyl monomer and b) a cross-linker containing at least one isocyanate group and a further group that forms cross-linking sites. Water, any organic solvents and any other substances that can dissolve carboxylated hydrogenated acrylonitrile-butadiene copolymers are mentioned as solvents (C). The solvent (C) is thus employed in amounts from 70 to 97% by weight, based on the total coating composition. The liquid compositions are applied to the surface to be coated, dried and vulcanized. Cross-linkage times of 16 hours are described. Cross-linkers (B) mentioned are generally polyisocyanates, chain-extended polyisocyanates, polymeric isocyanate-polyol adducts, polycarbodiimides, multifunctional oxazolines, multifunctional oxazines, multifunctional imidazolines, phenolic novolaks, phenolic resols, amino resins and amino (alkoxy)silanes. Aqueous HXNBR latices in combination with a cross-linker in the form of an aromatic pre-polymer based on diphenylmethane diisocyanate or of an aliphatic pre-polymer based on 1,6-hexamethylene diisocyanate are explicitly described in Example 3. Similar 2-component coating compositions are also described in WO-A-2004/033573. However, heat-conducting metal particles are additionally added to these.

In EP-A-0 001 092, liquid hydroxyl group-containing polymers having an aliphatic polymer backbone are described, which contain sulphide bonds in proximity to the end groups of the polymer molecules and are obtained by polymerization (1) at least of a vinylidene monomer with a mixture of at least one hydroxyl group-containing disulphide and at least one hydroxyl group-containing trisulphide. Rubbers containing repeating units at least of a conjugated diene and at least of an unsaturated nitrile and at least of a copolymerizable hydroxyl group-containing monomer are not described. The use of the mixture of di- and trisulphide allows the control of the molecular weight and makes possible the production of liquid polymers.

The object of the present invention was thus the provision of cross-linkers for hydroxyl group-containing (H)NBR rubbers, which avoid the disadvantages of the existing cross-linkers. They should especially be able to be employed without use of tin-containing catalysts for cross-linking and preferably have a high vapour pressure and a high functionality.

The chemicals employed as cross-linkers should furthermore have good handleability and low toxicity. The nitrile rubbers cross-linked and optionally hydrogenated in this way should preferably yield good to very good values in the pressure deformation test as well as in the tensile extension test, exhibit good to very good vulcanization behaviour (customarily measured in an MDR rotary vulcameter) and thus offer an alternative to the conventional systems.

The object is achieved according to the invention by the use of compounds of the general formula (I), (II), (III) or (IV) as cross-linkers for hydroxyl group-containing (H)NBR rubbers,

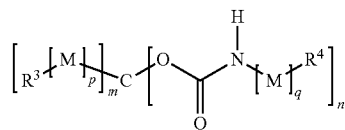

(I)

wherein
R$^1$ is O-[M]$_p$-R$^3$, NH-[M]$_p$-R$^3$
R$^2$ is H
or R$^1$ and R$^2$ together yield a single bond or one of the following groups

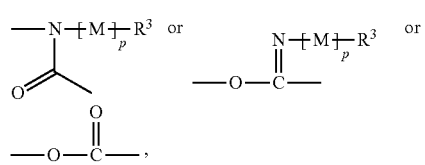

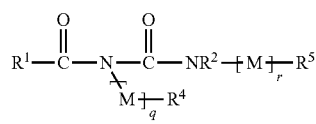

(II)

wherein
n is an integer from 1 to 4 and
m=4−n

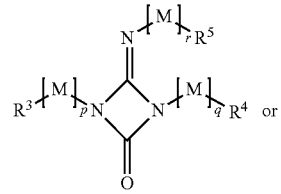

(III)

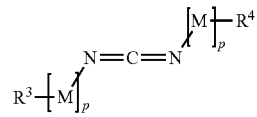

(IV)

where in the general formulae (I), (II), (III) and (IV)
R$^3$, R$^4$, R$^5$ are identical or different and denote H or a radical that contains one or more of the following groups,
a saturated, mono- or polyunsaturated carbo- or heterocyclyl radical, straight-chain or branched alkyl, aryl, heteroaryl, arylalkyl, heteroarylalkyl, alkoxy, aryloxy, heteroaryloxy, amino, amido, hydroxyimino, carbamoyl, alkoxycarbonyl, F, Cl, Br, I, hydroxyl, phosphonato, phosphinato, alkylthio, arylthio, sulphanyl, thiocarboxy, sulphinyl, sulphono, sulphino, sulpheno, sulphonic acids, sulphamoyl, silyl, silyloxy, nitrile, sulphanyl, hydroperoxycarbonyl, hydroperoxy, thiocarboxy, dithiocarboxy, hydroxyimino, nitro, nitrosyl, carbonyl, carboxy, oxycarbonyl, oxysulphonyl, oxo, thioxo, borate, selenate, epoxy, cyanate, thiocyanate, isocyanate, thioisocyanate or isocyanide,
M represents repeating units of one or more mono- or polyunsaturated monomers, comprising conjugated or non-conjugated dienes, alkynes and vinyl compounds, or represents a divalent structural element, which is derived from polymers comprising polyethers, especially polyalkylene glycol ethers and polyalkylene oxides, polysiloxanes, polyols, polycarbonates, polyurethanes, polyisocyanates, polysaccharides, polyesters and polyamides, and
p, q, r, are identical or different and lie in the range from 0 to 10 000,
and where the compounds of the general formula (I), (II), (III) and (IV) in each case contain at least two isocyanate groups.

The formulation that in each case "at least two isocyanate groups" are contained in the compounds of the general formula (I), (II), (III) and (IV) means in the context of this application that either at least two free isocyanate groups (—NCO) or else protected isocyanate groups are concerned here, from which the —NCO groups are released in-situ under the cross-linking conditions.

In a preferred embodiment, the at least two isocyanate groups in the compounds of the general formula (I), (II), (III) and (IV) are contained in at least two of the radicals R$^3$, R$^4$ and R$^5$ respectively.

Particularly preferably, the compounds of the general formula (I), (II), (III) or (IV) are dimers or trimers of monomeric diisocyanates.

The cross-linkers according to the invention have the advantage that they can be employed in the absence of tin-containing compounds and lead to a good cross-linkage of the hydroxyl group-containing (H)NBR rubbers.

The subject of the invention is furthermore a vulcanizable composition, comprising at least one hydroxyl group-containing (H)NBR rubber and at least one cross-linker, as is defined above and below.

The subject of the invention is also a process for the production of these vulcanizable compositions by blending of at least one hydroxyl group-containing (H)NBR rubber and of at least one cross-linker as defined above or below.

The subject of the invention is moreover a process for the production of vulcanizates, in which the above vulcanizable compositions are cross-linked with heating, and the vulcanizates, preferably moulded parts, which are obtainable by this process.

It was found that by the use according to the invention of the compounds of the general formula (I), (II), (III) or (IV), especially of the dimers or trimers of monomeric diisocyanates, a thermally stable network can be constructed with the hydroxyl group-containing optionally hydrogenated nitrile rubbers and for good cross-linkage no tin compounds or heavy metal compounds are needed as a further cross-linking catalyst. The compounds of the general formula (I), (II), (III) or (IV) employed can additionally be simply handled. The vulcanizates produced exhibit very good values in the pressure deformation test at room temperature and 100° C. and in addition a high tensile stress with good breaking elongations. Especially when using HEMA (hydroxyethyl methacrylate) as a hydroxyl-containing termonomer, in the optionally hydrogenated nitrile rubber, very good results can be achieved.

In the use according to the invention, solvents with a proven record are not present at all or only in small amounts. For example, a use according to the invention is proven in which either no solvent at all or else not more than 15% by weight of solvent, based on the hydroxyl group-containing (H)NBR rubber is present. Preferably, not more than 10% by weight, particularly preferably not more than 5% by weight, very particularly preferably not more than 2% by weight and especially preferably not more than 1% by weight of solvent, based on the hydroxyl group-containing (H)NBR rubber, are present. "Solvents" are to be understood here as meaning especially water, all inorganic solvents and all other substances that dissolve hydroxyl group-containing (H)NBR rubber, or any desired mixtures of the aforementioned substances.

This means that the hydroxyl group-containing (H)NBR rubber in the use according to the invention is employed as such, that is in bulk. It is especially not pretreated in a separate dissolution step.

In spite of the absence of solvents or of the presence of only small amounts, the hydroxyl group-containing (H)NBR-rubbers employed can be excellently and rapidly cross-linked with the compounds of the general formula (I), (II), (III) or (IV). This is surprising, since it could be assumed from this that on account of only a low mobility of the cross-linker in the polymer matrix here problems could occur, especially an inadequate cross-linkage in the case of short cross-linkage times.

The absence of solvents or the presence of only small amounts moreover lowers the partial vapour pressure and the vapour pressure of the mixture, which thus leads to lower emissions—especially with organic solvents.

The compounds of the general formula (I), (II), (III) or (IV) to be employed according to the invention preferably have at least one allophanate, biuret, uretdione, isocyanurate, iminooxadiazinedione, bridged carbamate, oxadiazinetrione, uretonimine or carbodiimide structure.

Suitable compounds of the general formula (I) are the following compounds of the general structures (I-1) to (I-6),

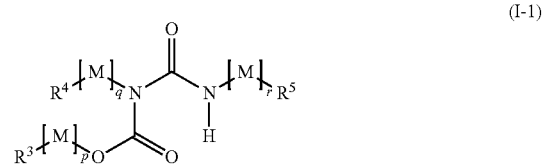

(I-1)

(The compound of the structure (I-1) is an allophanate and results from the general formula (I), if $R^1=O-[M]_p-R^3$, where $R^3$, $R^4$ and $R^5$ in total must contain at least two NCO groups.)

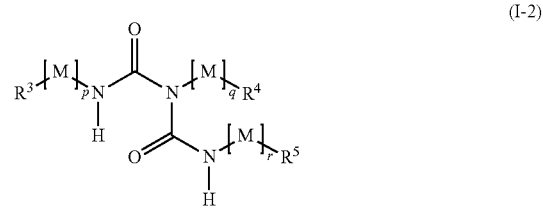

(I-2)

(The compound of the structure (I-2) is a biuret and results from the general formula (I), if $R^1=NH-[M]_p-R^3$, where $R^3$, $R^4$ and $R^5$ in total must contain at least two NCO groups.)

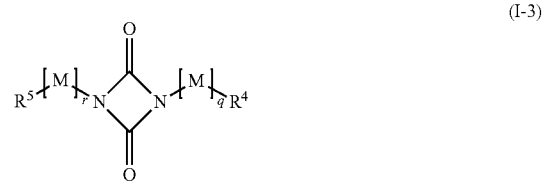

(I-3)

(The compound of the structure (I-3) is a uretdione and results from the general formula (I), if $R^1$ and $R^2$ together form a single bond, where $R^4$ and $R^5$ in total must contain at least two NCO groups.)

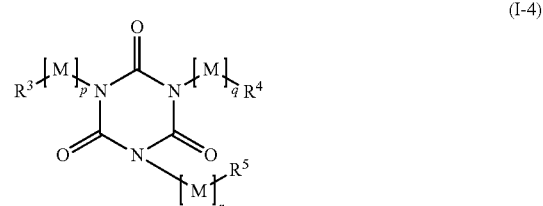

(I-4)

(The compound of the structure (I-4) is an isocyanurate and results from the general formula (I), if $R^1$ and $R^2$ together are a group

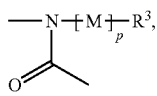

where $R^3$, $R^4$ and $R^5$ in total must contain at least two NCO groups.)

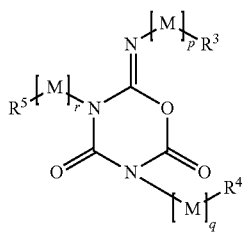
(I-5)

(The compound of the structure (I-5) is an iminooxadiazinedione and results from the general formula (I), if $R^1$ and $R^2$ together are a group

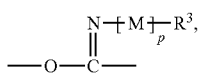

where $R^3$, $R^4$ and $R^5$ in total must contain at least two NCO groups.)

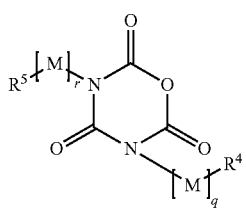
(I-6)

(The compound of the structure (I-6) is an oxadiazinetrione and results from the general formula (I), if $R^1$ and $R^2$ together are a group (—O—C(=O)—), where $R^4$ and $R^5$ in total must contain at least two NCO groups.)
where in the formulae (I-1) to (I-6)
$R^3$, $R^4$ and $R^5$ are identical or different and denote H or a radical that contains one or more of the following groups, a linear or branched, saturated, mono- or polyunsaturated alkyl radical, a saturated, mono- or polyunsaturated carbo- or heterocyclyl radical, aryl, heteroaryl, arylalkyl, heteroarylalkyl, alkoxy, aryloxy, heteroaryloxy, amino, amido, hydroxyimino, carbamoyl, alkoxycarbonyl, F, Cl, Br, I, hydroxy, phosphonato, phosphinato, alkylthio, arylthio, sulphanyl, thiocarboxy, sulphinyl, sulphono, sulphino, sulpheno, sulphonic acids, sulphamoyl, silyl, silyloxy, nitrile, sulphanyl, hydroperoxycarbonyl, hydroperoxy, thiocarboxy, dithiocarboxy, hydroxyimino, nitro, nitrosyl, carbonyl, carboxy, oxycarbonyl, oxysulphonyl, oxo, thioxo, borate, selenate, epoxy, cyanate, thiocyanate, isocyanate, thioisocyanate or isocyanide,
M represents repeating units of one or more mono- or polyunsaturated monomers, comprising conjugated or non-conjugated dienes, alkynes and vinyl compounds, or represents a divalent structural element, which is derived from polymers comprising polyethers, especially polyalkylene glycol ethers and polyalkylene oxides, polysiloxanes, polyols, polycarbonates, polyurethanes, polyisocyanates, polysaccharides, polyesters and polyamides and p, q, r, are identical or different and are in each case in the range from 0 to 10 000.

In a furthermore preferred variant, in the compounds of the structures (I-1) to (I-6) the indices p, q and r are in each case equal to zero.

It is furthermore possible that the aforementioned structures (I-1) to (I-6) also occur several times in the molecule and are then connected via bridging (di-, tri- or polyisocyanate) structural elements.

The compounds of the general formula (II) are bridged carbamates. For clarification only, it may be explained that the radicals $R^3$ can not only be different from the radicals $R^4$, but also the radicals $R^3$ can be different to one another, just like the radicals $R^4$ can be different to one another, if several radicals $R^3$ and/or $R^4$ are present in the molecule.

The compounds of the general formula (III) are a uretonimine, the compounds of the general formula (IV) a carbodiimide.

If the term "substituted" is used in this application, this means that a hydrogen atom on a specified radical or atom is replaced by one of the groups specified, with the proviso that the valency of the specified atom is not exceeded and always only with the condition that this substitution leads to a stable compound.

The meanings mentioned for the radicals $R^3$, $R^4$, $R^5$ in the general formulae (I) to (IV) and (I-1) to (I-6) can in each case be mono- or polysubstituted. Preferably, the following radicals are mono- or polysubstituted: alkyl, carbocyclyl, heterocyclyl, aryl, heteroaryl, arylalkyl, heteroarylalkyl, alkoxy, aryloxy, alkylthio, arylthio, amino, amido, carbamoyl, phosphonato, phosphinato, sulphanyl, thiocarboxy, sulphinyl, sulphono, sulphino, sulpheno, sulphamoyl, silyl, silyloxy, carbonyl, carboxy, oxycarbonyl, oxysulphonyl, oxo, thioxo, borate, selenate and epoxy.

Suitable substituents here—if chemically stable compounds result—are all meanings that $R^3$, $R^4$, $R^5$ can assume. Particularly suitable substituents are halogen, preferably fluorine, chlorine, bromine or iodine, nitrile (CN) and carboxyl.

The meanings mentioned for $R^1$, $R^2$, $R^3$, $R^4$ and $R^5$ in the general formulae (I) to (IV) and (I-1) to (I-6) explicitly also include salts of $R^1$-$R^5$ of the compounds mentioned, if these are chemically possible and stable. These can be, for example, ammonium salts, alkali metal salts, alkaline earth metal salts, aluminium salts or protonated forms of the compounds of the general formulae (I) to (IV) and (I-1) to (I-6).

The meanings mentioned for $R^1$, $R^2$, $R^3$, $R^4$ and $R^5$ in the general formulae (I) to (IV) and (I-1) to (I-6) also include compounds of $R^1$, $R^2$, $R^3$, $R^4$ and $R^5$ with organometallic radicals, for example those which impart a Grignard function to the respective compound. $R^1$, $R^2$, $R^3$, $R^4$ or $R^5$ can furthermore be or contain a carbanion, with lithium, zinc, tin, aluminium, lead and boron in correspondingly equivalent form as a counterion.

It is furthermore possible that $R^1$, $R^2$, $R^3$, $R^4$ or $R^5$ is coupled via a linker to a solid phase or carrier substance. The linker can be a Wang, Sasrin, Rink acid, 2-chlorotrityl, Mannich, safety-catch, traceless or photolabile linker known to the person skilled in the art. Suitable solid phases or carrier substances are, for example, silica, ion-exchange resins, clay, montmorillonite, cross-linked polystyrene, polyethylene glycol grafted onto polystyrene, polyacrylamides ("Pepsyn"), polyethylene glycol/acrylamide copolymers (PEGA), cellulose, cotton and granular porous glass (CPG, controlled pore glass).

It is furthermore possible that the compounds of the general formulae (I) to (IV) and (I-1) to (I-6) function as ligands for organometallic complex compounds, e.g. for those based on the central metals rhodium, ruthenium, titanium, platinum, iridium, palladium, rhenium, ruthenium, osmium, cobalt, iron or copper.

The abovementioned meanings for the radical "M" can be mono- or polysubstituted. Thus M can be repeating units of one or more mono- or polyunsaturated monomers, preferably of optionally mono- or polysubstituted conjugated or non-conjugated dienes, optionally mono- or polysubstituted alkynes or optionally mono- or polysubstituted vinyl compounds, for example fluorinated mono- or polyunsaturated vinyl compounds, or else a divalent structural element, which is derived from substituted or unsubstituted polymers comprising polyethers, especially polyalkylene glycol ethers and polyalkylene oxides, polysiloxanes, polyols, polycarbonates, polyurethanes, polyisocyanates, polysaccharides, polyesters and polyamides.

The radicals "M" can thus be monomeric or polymeric radicals.

The radicals $R^1$, $R^2$, $R^3$, $R^4$, $R^5$ here in total contain two or more isocyanate groups for one cross-linkage. These can alternatively also be protected using a protective group, as known to the person skilled in the art, which is removed by a process known to the person skilled in the art during or before vulcanization (in the latter case, however, even after mixing with the hydroxyl group-containing (H)NBR). $R^1$-$R^5$ can, but do not have to, be different groups The preparation of appropriate compounds of the general formulae (I) to (IV) is known per se to the person skilled in the art and can be carried out, for example, according to the procedure described in EP 1 422 223 A 1 using phosphine-containing catalyst systems. The compounds of the general formulae (I) to (IV) can furthermore be prepared according to methods which are described in EP 1 521 789 A 1 (using 1,2,3- or 1,2,4-triazolates as catalysts), the article in Polymer Preprints (American Chemical Society) 2003, 44(1), 46-47 (using polyfluorides as catalysts), EP 1 352 006 A1 (using superacids as a catalyst) and EP 0 572 995 A1 (using imidazole-containing polymers). For the preparation of compounds containing uretdione groups, reference may be made, inter alia, to WO 2004/005364 and WO 2004/005364 and DE 10 2007 058 487 A1. For compounds having carbodiimide and uretonimine structure, reference may be made to DE 10 2005 058 835 A1. U.S. Pat. No. 4,115,373 A describes the trimerization of isocyanates to compounds containing isocyanurate groups in inert solvents using Mannich bases as catalysts. A survey of oligomerization is given in J. Prakt. Chem./Chem. Ztg. 1994, 336, 185-200.

A dimeric, trimeric, oligomeric or polymeric di- or polyisocyanate is employed as a cross-linker for the optionally hydrogenated nitrile rubber. The formulation "di- or polyisocyanate" here represents the fact that the cross-linker has two or more free or optionally blocked isocyanate groups in the molecule, "dimer, trimer, oligomer or polymer" here represents the fact that the cross-linker is constructed from an appropriate number of two, three or more monomeric mono-, di- or polyisocyanates.

The preparation of blocked or protected isocyanate functionalities and their deprotection are described, inter alia, in the article "Blocked Isocyanates" by Z. W. Wicks Jr. in Progress in Organic Coatings 1975, 3, 73-99 and "Blocked Isocyanates III: Part A: Mechanism and Chemistry" by Z. W. Wicks Jr., D. A. Wicks in Progress in Organic Coatings 1999, 36, 148-172. Generally, a blocked isocyanate is understood as meaning an isocyanate that has reacted with a blocking reagent, and that reacts in the presence of a nucleophile to give its isocyanate adduct, where the blocking reagent can be removed from the isocyanate again by suitable reaction conditions.

The use according to the invention of cross-linkers that contain (i) units of dimeric and trimeric diisocyanates as a structural element is preferred, where these can also occur repeatedly in the cross-linker molecule, and which have (ii) two or more free isocyanate groups in the molecule.

The use of cross-linkers based on dimeric or trimeric diisocyanates, which contain allophanate, biuret, uretdione, uretonimine, bridged carbamate, carbodiimide, oxadiazinetrione, isocyanurate or iminooxadiazinedione structural elements, and two or more free isocyanate groups in the molecule, is particularly preferred. These can also be present as oligomeric or polymeric allophanates, biurets, uretdiones, uretonimines, bridged carbamates, carbodiimides, isocyanurates, oxadiazinetriones or iminooxadiazinediones, i.e. in that the individual rings are then connected to give an oligomer or polymer. A corresponding oligomer or polymer formation especially occurs if di- or poly-functional isocyanates are used as monomeric isocyanates.

Fundamentally, it is possible that the cross-linker is based on a sole type of a monomeric, oligomeric or polymeric di- or polyisocyanate. However, it is also possible that the structural elements mentioned come about by a reaction of various monomeric, oligomeric or polymeric di- or polyisocyanates.

Suitable examples of cyclic cross-linkers based on monomeric diisocyanates, which contain an aliphatic or cycloaliphatic radical, are known per se to the person skilled in the art and based, for example, on the monomeric diisocyanates isophorone diisocyanate, 1,4-cyclohexyl diisocyanate, 1,1-methylenebis(4-isocyanatocyclohexane), 1,2-bis(4-isocyanatononyl)-3-heptyl-4-pentylcyclohexane and hexamethylene-1,6-diisocyanate. The use of isophorone diisocyanate and hexamethylene-1,6-diisocyanate for the preparation of the cross-linkers to be employed according to the invention is preferred.

It is furthermore possible to use a cyclic cross-linker based on monomeric diisocyanates, which is obtained starting from a monomeric aromatic di- or polyisocyanate. The monomeric aromatic di- or polyisocyanate preferably has 6 to 20 carbon atoms, particularly preferably 6 to 15 carbon atoms. Suitable aromatic monomeric di- or polyisocyanates are, for example, 2,4-diisocyanatotoluene, 2,6-diisocyanatotoluene, 1,5-naphthylene diisocyanate, 4,4'-methylenediphenyl diisocyanate, 1,3-bis-(3-isocyanato-4-methylphenyl)-2,4-dioxodiazetidine, N,N'-bis-(4-methyl-3-isocyanatophenyl)urea and tetramethyl xylylenediisocyanate. Of these monomeric aromatic di- or polyisocyanates, 2,4-diisocyanatotoluene, 2,6-diisocyanatotoluene and 4,4'-methylenebis(phenyl diisocyanate) are preferred. Especially preferred are 2,6-diisocyanatotoluene and 4,4'-methylenebis(phenyl diisocyanate).

Allophanates:

In the context of the present invention, allophanates (carbamoylcarbamates) of the general structural formula (I-1) can preferably be used.

These allophanate group-containing compounds are accessible, for example, by reaction of any desired urethane-containing starting compounds (containing units of the general formula (R³-[M]$_p$-O—C(=O)—N(H)-[M]$_q$-R⁴) with monoisocyanates of the general formula R⁵-[M]$_r$-NCO or with diisocyanates of the general formula OCN-A-NCO, where R⁵ preferably represents an alkyl radical having 1 to 20 carbon atoms or an aryl radical having 6 to 20 carbon atoms or A denotes a corresponding divalent $C_1$-$C_{20}$ alkylene radical or $C_6$-$C_{20}$ arylene radical.

The urea group-containing intermediates passed through under certain circumstances in such allophanate syntheses can also be isolated and thus represent a new starting compound.

As monoisocyanates, any desired aromatic, aliphatic and cycloaliphatic monoisocyanates having 2 to 20 carbon atoms, such as methyl isocyanate, isopropyl isocyanate, n-butyl isocyanate, n-hexyl isocyanate, cyclohexyl isocyanate, stearyl isocyanate, optionally halogenated phenyl isocyanates, 1-naphthyl isocyanate, optionally chlorinated or fluorinated m-, o-, and p-toluoyl isocyanates, p-isopropylphenyl isocyanate, 2,6-diisopropylphenyl isocyanate and p-toluenesulphonyl diisocyanate, are suitable for the preparation of the allophanates.

As diisocyanates, any desired aromatic, aliphatic and cycloaliphatic diisocyanates having 6 to 40 carbon atoms, preferably 6 to 15 carbon atoms, such as isophorone diisocyanate, 1,4-cyclohexyl di-isocyanate, 1,1-methylenebis(isocyanatohexane), 1,2-bis(4-isocyanatononyl)-3-heptyl-4-pentylcyclohexane, hexamethylene 1,6-diisocyanate, 2,4-diisocyanatotoluene, 2,6-diisocyanatotoluene, 1,5-naphthylene diisocyanate, 4,4'-methylenediphenyl diisocyanate, 1,3-bis(3-isocyanto-4-methylphenyl)-2,4-di-oxodiazetidine, N,N'-bis(4-methyl-3-isocyanatophenyl)urea and tetramethylxylylene diisocyanate, are suitable for the preparation of the allophanates. Of these, hexamethylene 1,6-diisocyanate is preferred.

Such allophanates and their preparation are described, for example, in EP 0 000 194 A1, whose disclosure in this respect is included in the present invention by way of reference. The isocyanate employed for the allophanate formation can be employed, based on the urethane groups of the starting compound present, in a substoichiometric or equimolar amount as well as in excess. In the latter case, the excess isocyanate must be separated off after the reaction is complete by a method known to the person skilled in the art, such as, for example, distillation or extraction. It is therefore preferred to employ 0.1 to 1.0 mol of isocyanate per 1.0 mol of urethane groups of the starting compound; the use of 0.5 to 1.0 mol of isocyanate is particularly preferred. The allophanate or biuret formation of the urethane or urea groups by the monoisocyanates is preferably carried out with the use of catalysts.

Particularly preferably, the cross-linkers employed according to the invention are dimers or trimers of monomeric diisocyanates, especially uretdiones or isocyanurates. Especially preferably, trimeric hexamethylene diisocyanate with isocyanurate structure is employed.

Hydrogen sulphide adducts (carbamoylsulphonates) or oxime adducts can be employed, for example, for blocking isocyanate groups. Blocking can be carried out, for example, using sodium disulphide, it being possible to deblock the adduct again at temperatures of approximately 100° C. Suitable blocking agents are furthermore phenols, such as phenol, nonylphenol, cresol, oximes such as butanone oxime, cyclohexanone oxime, lactams such as γ-caprolactam, secondary amines such as diisopropylamine, pyrazoles such as dimethylpyrazole, imidazoles or triazoles as well as malonic and acetic acid esters.

Any desired optionally hydrogenated nitrile rubbers can be employed as hydroxyl group-containing (H)NBR rubbers in the context of this application, provided they are hydroxyl group-containing.

Typically, the hydroxyl group-containing (H)NBR rubbers have repeating units derived from at least one conjugated diene, at least one α,β-unsaturated nitrile, at least one copolymerizable hydroxyl group-containing monomer and optionally one or more other copolymerizable monomers or copolymerizable cross-linking monomers, where the C=C double bonds in these repeating units are completely or partially hydrogenated in the case of the hydrogenated nitrile rubber ("HNBR").

Preferably, at least one hydroxyl group of the copolymerizable hydroxyl group-containing monomer is not bonded to the C atom of a carboxyl group, to which the oxygen atom is furthermore bonded by double bonding.

Possible copolymerizable hydroxyl group-containing monomers are preferably hydroxyalkyl(meth)acrylates or copolymerizable unsaturated vinyl monomers containing at least one hydroxyl group, such as, for example, 4-vinylphenol. Hydroxyalkyl acrylates and hydroxyalkyl methacrylates are preferred in which the C atom number of the hydroxyalkyl groups is 1 to 20, preferably 1 to 12.

Examples of suitable hydroxyl group-containing monomers are 2-hydroxyethyl(meth)acrylate, 2-hydroxypropyl(meth)acrylate, 3-hydroxypropyl(meth)acrylate, 3-chloro-2-hydroxypropyl(meth)-acrylate, 3-phenoxy-2-hydroxypropyl(meth)acrylate, glycerol mono(meth)acrylate, hydroxybutyl(meth)acrylate, hydroxyhexyl(meth)acrylate, hydroxyoctyl(meth)acrylate, hydroxymethyl(meth)acrylamide, 2-hydroxypropyl(meth)acrylate, 3-hydroxypropyl(meth)acrylamide, di(ethylene glycol) itaconate, di(propylene glycol) itaconate, bis(2-hydroxypropyl)itaconate, bis(2-hydroxyethyl)itaconate, bis(2-hydroxyethyl)fumarate, bis(2-hydroxyethyl)maleate, hydroxymethyl vinyl ketone, (4-vinylphenyl)methanol and 4-vinylphenol.

Hydroxyalkyl(meth)acrylates are particularly preferred, especially hydroxyethyl(meth)acrylate and hydroxypropyl(meth)acrylate, especially 2-hydroxyethyl methacrylate (HEMA) or 2-hydroxyethyl acrylate (HEA).

The proportion of hydroxyl group-containing monomers in the (H)NBR rubber here is generally 0.1 to 25% by weight, preferably 0.5 to 10% by weight, particularly preferably 1.5 to 7% by weight and especially 1.5 to 5% by weight.

The conjugated diene in the nitrile rubber can be of any nature. Preferably, ($C_4$-$C_6$) conjugated dienes are employed. 1,2-Butadiene, 1,3-butadiene, isoprene, 2,3-dimethylbutadiene, piperylene or mixtures thereof are particularly preferred. 1,3-Butadiene and isoprene or mixtures thereof are especially preferred. 1,3-Butadiene is very particularly preferred.

The α,β-unsaturated nitrile employed can be any known α,β-unsaturated nitrile; ($C_3$-$C_5$)-α,β-unsaturated nitriles such as acrylonitrile, methacrylonitrile, ethacrylonitrile or mixtures thereof are preferred. Acrylonitrile is particularly preferred.

A preferred optionally hydrogenated nitrile rubber is a polymer with repeating units exclusively derived from (i) one or more ($C_4$-$C_6$) conjugated dienes, (ii) one or more ($C_3$-$C_5$)-α,β-unsaturated nitriles and (iii) one or more copolymerizable hydroxyl group-containing monomers in each case containing at least one hydroxyl group that is not bonded to the C atom of a carboxyl group, to which furthermore an oxygen atom is bonded by double bonding.

A particularly preferred optionally hydrogenated nitrile rubber is a polymer with repeating units exclusively derived from (i) a ($C_4$-$C_6$) conjugated diene, (ii) a ($C_3$-$C_5$)-α,β-unsaturated nitrile and (iii) a copolymerizable hydroxyl group-containing monomer containing at least one hydroxyl group that is not bonded to the C atom of a carboxyl group, to which furthermore an oxygen atom is bonded by double bonding.

A very particularly preferred optionally hydrogenated nitrile rubber is a polymer with repeating units exclusively derived from (i) one or more ($C_4$-$C_6$)-conjugated dienes, (ii) one or more ($C_3$-$C_5$)-α,β-unsaturated nitriles and (iii) one or more hydroxyalkyl(meth)acrylates.

An optionally hydrogenated nitrile rubber with repeating units exclusively derived from (i) butadiene, (ii) acrylonitrile and (iii) one or more hydroxyalkyl(meth)acrylates is especially preferred.

A particularly preferred nitrile rubber is a copolymer of acrylonitrile and 1,3-butadiene and also HEMA or HEA. A particularly preferred hydrogenated nitrile rubber is a copolymer of acrylonitrile and 1,3-butadiene and also HEMA or HEA, in which the C=C double bonds in the repeating units are completely or partly hydrogenated.

Further copolymerizable monomers that can be employed—if desired—are, for example, aromatic vinyl monomers, preferably styrene, α-methylstyrene and vinylpyridine, fluorine-containing vinyl monomers, preferably fluoroethyl vinyl ether, fluoropropyl vinyl ether, o-fluoromethylstyrene, vinyl pentafluorobenzoate, difluoroethylene and tetrafluoroethylene, or alternatively copolymerizable antiageing monomers, preferably N-(4-anilinophenyl)acrylamide, N-(4-anilinophenyl)methacrylamide, N-(4-anilinphenyl)cinnamide, N-(4-anilinophenyl)-crotonamide, N-phenyl-4-(3-vinylbenzyloxy)aniline and N-phenyl-4-(4-vinylbenzyloxy)aniline as well as non-conjugated dienes, such as 4-cyanocyclohexene and 4-vinylcyclohexene, or alternatively alkynes, such as 1- or 2-butyne.

Alternatively, carboxyl group-containing termonomers, e.g. α,β-unsaturated monocarboxylic acids, their esters, α,β-unsaturated dicarboxylic acids, their mono- or -diesters or their corresponding anhydrides or amides can be employed as further copolymerizable monomers.

Acrylic acid and methacrylic acid can preferably be employed as α,β-unsaturated monocarboxylic acids.

Esters of the α,β-unsaturated monocarboxylic acids, preferably their alkyl esters and alkoxyalkyl esters, are also employable. The alkyl esters are preferred, especially $C_1$-$C_{18}$ alkyl esters of the α,β-unsaturated monocarboxylic acids. Alkyl esters are particularly preferred, especially $C_1$-$C_{18}$ alkyl esters of acrylic acid or of methacrylic acid, especially methyl acrylate, ethyl acrylate, propyl acrylate, n-butyl acrylate, tert-butyl acrylate, 2-ethylhexyl acrylate, n-dodecyl acrylate, methyl methacrylate, ethyl methacrylate, butyl methacrylate and 2-ethylhexyl methacrylate. Alkoxyalkyl esters of the α,β-unsaturated monocarboxylic acids are also preferred, particularly preferably alkoxyalkyl esters of acrylic acid or of methacrylic acid, especially $C_2$-$C_{12}$-alkoxyalkyl esters of acrylic acid or of methacrylic acid, very particularly preferably methoxymethyl acrylate, methoxyethyl(meth)acrylate, ethoxyethyl(meth)acrylate and methoxyethyl(meth)acrylate. Also employable are mixtures of alkyl esters, such as, for example, the aforementioned, with alkoxyalkyl esters, e.g. in the form of the aforementioned. Also employable are cyanoalkyl acrylates and cyanoalkyl methacrylates, in which the C atom number of the cyanoalkyl group is 2-12, preferably α-cyanoethyl acrylate, β-cyanoethyl acrylate and cyanobutyl methacrylate. Also employable are fluorine-substituted benzyl group-containing acrylates or methacrylates, preferably fluorobenzyl acrylate, and fluorobenzyl methacrylate. Also employable are fluoroalkyl group-containing acrylates and methacrylates, preferably trifluoroethyl acrylate and tetrafluoropropyl methacrylate. Also employable are amino group-containing α,β-unsaturated carboxylic acid esters such as dimethylaminomethyl acrylate and diethylaminoethyl acrylate.

α,β-Unsaturated dicarboxylic acids, preferably maleic acid, fumaric acid, crotonic acid, itaconic acid, citraconic acid and mesaconic acid, can furthermore be employed as further copolymerizable monomers.

α,β-Unsaturated dicarboxylic acid anhydrides, preferably maleic anhydride, itaconic anhydride, citraconic anhydride and mesaconic anhydride, can furthermore be employed.

Mono- or diesters of α,β-unsaturated dicarboxylic acids can furthermore be employed.

These α,β-unsaturated dicarboxylic acid mono- or diesters can, for example, be alkyl, preferably $C_1$-$C_{10}$-alkyl, especially ethyl, n-propyl, isopropyl, n-butyl, tert-butyl, n-pentyl or n-hexyl, alkoxyalkyl, preferably $C_2$-$C_{12}$-alkoxyalkyl, particularly preferably $C_3$-$C_8$-alkoxyalkyl, hydroxyalkyl, preferably $C_1$-$C_{12}$-hydroxyalkyl, particularly preferably $C_2$-$C_8$-hydroxyalkyl, cycloalkyl, preferably $C_5$-$C_{12}$-cycloalkyl, particularly preferably $C_6$-$C_{12}$-cycloalkyl, alkylcycloalkyl, preferably $C_6$-$C_{12}$-alkylcycloalkyl, particularly preferably $C_7$-$C_{10}$-alkylcycloalkyl, aryl, preferably $C_6$-$C_{14}$-aryl mono- or diesters, where in the case of the diesters they can in each case also be mixed esters.

Particularly preferred alkyl esters of α,β-unsaturated monocarboxylic acids are methyl (meth)acrylate, ethyl (meth)acrylate, propyl (meth)acrylate, n-butyl (meth)acrylate, t-butyl (meth)acrylate, hexyl (meth)acrylate, 2-ethylhexyl (meth)acrylate, octyl (meth)acrylate, 2-propylheptyl acrylate and lauryl (meth)acrylate. n-Butyl acrylate is especially employed.

Particularly preferred alkoxyalkyl esters of the α,β-unsaturated monocarboxylic acids are methoxyethyl (meth) acrylate, ethoxyethyl (meth)acrylate and methoxyethyl (meth)acrylate. Methoxyethyl acrylate is especially employed.

Polyethylene glycol (meth)acrylate, polypropylene glycol (meth)acrylate, glycidyl (meth)acrylate, epoxy (meth)acrylate, N-(2-hydroxyethyl)acrylamide, N-(2-hydroxymethyl) acrylamide and urethane (meth)acrylate, for example, are furthermore employed as other possible esters of the α,β-unsaturated monocarboxylic acids.

Examples of α,β-unsaturated dicarboxylic acid monoesters include
  maleic acid monoalkyl esters, preferably monomethyl maleate, monoethyl maleate, monopropyl maleate and mono-n-butyl maleate;
  maleic acid monocycloalkyl esters, preferably monocyclopentyl maleate, monocyclohexyl maleate and monocycloheptyl maleate;
  maleic acid monoalkylcycloalkyl esters, preferably monomethylcyclopentyl maleate and monoethylcyclohexyl maleate;
  maleic acid monoaryl esters, preferably monophenyl maleate;
  maleic acid monobenzyl esters, preferably monobenzyl maleate;
  fumaric acid monoalkyl esters, preferably monomethyl fumarate, monoethyl fumarate, monopropyl fumarate and mono-n-butyl fumarate;

fumaric acid monocycloalkyl esters, preferably monocyclopentyl fumarate, monocyclohexyl fumarate and monocycloheptyl fumarate;
fumaric acid monoalkylcycloalkyl esters, preferably monomethylcyclopentyl fumarate and monoethylcyclohexyl fumarate;
fumaric acid monoaryl esters, preferably monophenyl fumarate;
fumaric acid monobenzyl esters, preferably monobenzyl fumarate;
citraconic acid monoalkyl esters, preferably monomethyl citraconate, monoethyl citraconate, monopropyl citraconate and mono-n-butyl citraconate;
citraconic acid monocycloalkyl esters, preferably monocyclopentyl citraconate, monocyclohexyl citraconate and monocycloheptyl citraconate;
citraconic acid monoalkylcycloalkyl esters, preferably monomethylcyclopentyl citraconate and monoethylcyclohexyl citraconate;
citraconic acid monoaryl esters, preferably monophenyl citraconate;
citraconic acid monobenzyl esters, preferably monobenzyl citraconate;
itaconic acid monoalkyl esters, preferably monomethyl itaconate, monoethyl itaconate, monopropyl itaconate and mono-n-butyl itaconate;
itaconic acid monocycloalkyl esters, preferably monocyclopentyl itaconate, monocyclohexyl itaconate and monocycloheptyl itaconate;
itaconic acid monoalkylcycloalkyl esters, preferably monomethylcyclopentyl itaconate and monoethylcyclohexyl itaconate;
itaconic acid monoaryl esters, preferably monophenyl itaconate;
itaconic acid monobenzyl esters, preferably monobenzyl itaconate;
mesaconic acid monoalkyl esters, preferably mesaconic acid monoethyl ester.

The analogous diesters based on the monoester groups mentioned can be employed as $\alpha,\beta$-unsaturated dicarboxylic acid diesters, where the ester groups also can be different chemically.

Possible other copolymerizable monomers or copolymerizable cross-linking monomers, are furthermore free-radical polymerizable compounds that contain at least two olefinic double bonds per molecule. Examples of polyunsaturated compounds are acrylates, methacrylates or itaconates of polyols such as, for example, ethylene glycol diacrylate, diethylene glycol dimethacrylate, triethylene glycol diacrylate, butanediol 1,4-diacrylate, propanediol 1,2-diacrylate, butanediol 1,3-dimethacrylate, neopentyl glycol diacrylate, trimethylolpropane di(meth)acrylate, trimethylolethane di(meth)acrylate, glycerol di- and triacrylate, pentaerythritol di-, tri- and tetraacrylate or methacrylate, dipentaerythritol tetra-, penta and hexaacrylate or methacrylate or itaconate, sorbitol tetraacrylate, sorbitol hexamethacrylate, diacrylates or dimethacrylates of 1,4-cyclohexanediol, 1,4-dimethylolcyclohexane, 2,2-bis(4-hydroxyphenyl)propane, of polyethylene glycols or of oligoesters or oligourethanes having terminal hydroxyl groups. Acrylamides such as, for example, methylene bisacrylamide, hexamethylene-1,6-bisacrylamide, diethylenetriamine tris-methacrylamide, bis(methacrylamido-propoxy)ethane or 2-acrylamidoethyl acrylate can also be used as polyunsaturated monomers. Examples of polyunsaturated vinyl and allyl compounds are divinylbenzene, ethylene glycol divinyl ether, diallyl phthalate, allyl methacrylate, maleate, triallyl isocyanurate or tray phosphate. In an embodiment, the copolymerizable cross-linking monomer is a triacrylate.

The proportions of conjugated diene and $\alpha,\beta$-unsaturated nitrile in the optionally hydrogenated nitrile rubbers can vary within wide ranges. The proportion or the sum of the conjugated dienes is customarily in the range from 39.5 to 90% by weight, preferably in the range from 48.5 to 85% by weight, based on the total polymer. The proportion of hydroxyl group-containing monomers here is generally 0.1 to 25% by weight, preferably 0.5 to 10% by weight, particularly preferably 1.5 to 7% by weight and especially 1.5 to 5% by weight, based on the total polymer. The proportion or the sum of the $\alpha,\beta$-unsaturated nitriles is customarily 9.5 to 60% by weight, preferably 13.5 to 50% by weight, based on the total polymer. The proportions of the monomers in each case add up to 100% by weight. The additional monomers, depending on the type of the termonomer(s), can be present in amounts from 0 to 50% by weight, based on the total polymer. In this case, corresponding proportions of the conjugated diene(s) and/or of the $\alpha,\beta$-unsaturated nitrile(s) are replaced by the proportions of the additional monomers, where the proportions of all monomers in each case add up to 100% by weight.

The nitrile rubbers according to the invention, which can also be completely or partially hydrogenated, have Mooney viscosities (ML (1+4 at 100° C.)) of customarily 10 to 160, preferably of 15 to 150 Mooney units, particularly preferably of 20 to 150 Mooney units and especially 25 to 145 Mooney units. The determination of the values for the Mooney viscosity (ML 1+4 at 100° C.) is in each case carried out by means of a shearing disc viscometer according to DIN 53523/3 or ASTM D 1646 at 100° C.

The nitrile rubbers employed furthermore have a polydispersity $PDI=M_w/M_n$, where $M_w$ is the weight average and $M_n$ the number average of the molecular weight, in the range from preferably 1.0-6.0 and preferably in the range from 1.5-5.0.

The glass transition temperatures of the optionally hydrogenated nitrile rubbers to be employed according to the invention lie in the range from −80° C. to +20° C., preferably in the range −70° C. to 10° C.

Metathesis and Hydrogenation:

Alternatively to the preparation of the nitrile rubber, it is also possible that either (i) a metathesis reaction or (ii) a metathesis reaction and a subsequent hydrogenation or (iii) only a hydrogenation follows the preparation of the nitrile rubber. These metathesis or hydrogenation reactions are both adequately known to the person skilled in the art and described in the literature. Metathesis is known, for example, from WO-A-02/100941 and also WO-A-02/100905 and can be employed for the molecular weight degradation. Hydrogenation can be carried out using homogeneous or heterogeneous hydrogenation catalysts.

The catalysts employed are customarily based on rhodium, ruthenium or titanium, however platinum, iridium, palladium, rhenium, ruthenium, osmium, cobalt or copper can also be employed either as a metal, or else preferably in the form of metal compounds (see, for example, U.S. Pat. No. 3,700,637, DE-A-25 39 132, EP-A-0 134 023, DE-A-35 41 689, DE-A-35 40 918, EP-A-0 298 386, DE-A-35 29 252, DE-A-34 33 392, U.S. Pat. Nos. 4,464,515 and 4,503,196).

Suitable catalysts and solvents for a homogeneous phase hydrogenation are described below and are also known from DE-A-25 39 132 and EP-A-0 471 250.

Selective hydrogenation can be achieved, for example, in the presence of a rhodium- or ruthenium-containing catalyst. A catalyst can be employed, for example, of the general formula

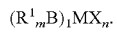

wherein M is ruthenium or rhodium, $R^1$ are identical or different and represent a $C_1$-$C_8$ alkyl group, a $C_4$-$C_8$ cycloalkyl group, a $C_6$-$C_{15}$ aryl group or a $C_7$-$C_{15}$ aralkyl group. B is phosphorus, arsenic, sulphur or a sulphoxide group S=O, X is hydrogen or an anion, preferably halogen and particularly preferably chlorine or bromine, l is 2, 3 or 4, m is 2 or 3 and n is 1, 2 or 3, preferably 1 or 3. Preferred catalysts are tris(triphenylphosphine)rhodium(I) chloride, tris(triphenylphosphine)-rhodium(III) chloride and tris(dimethyl sulphoxide)rhodium(III) chloride and tetrakis(triphenylphosphine)rhodium hydride of the formula $(C_6H_5)_3P)_4RhH$ and the corresponding compounds, in which the triphenylphosphine has been completely or partially replaced by tricyclohexylphosphine. The catalyst can be used in small amounts. An amount in the range from 0.01-1% by weight, preferably in the range from 0.03-0.5% by weight and particularly preferably in the range from 0.1-0.3% by weight based on the weight of the polymer is suitable.

Customarily, it is useful to use the catalyst together with a co-catalyst that is a ligand of the formula R1mB, where R1, m and B have the meanings mentioned beforehand for the catalyst. Preferably, m is equal to 3, B is equal to phosphorus and the radicals R1 can be identical or different. Preferably, these are co-catalysts having trialkyl, tricycloalkyl, triaryl, triaralkyl, diaryl monoalkyl, diaryl monocycloalkyl, dialkyl monoaryl, dialkyl monocycloalkyl, dicycloalkyl monoaryl or dicycloalkyl monoaryl radicals.

Examples of co-catalysts are found, for example, in U.S. Pat. No. 4,631,315. A preferred co-catalyst is triphenylphosphine. The co-catalyst is preferably employed in amounts in a range from 0.3-5% by weight, preferably in the range from 0.5-4% by weight, based on the weight of the nitrile rubber to be hydrogenated. Preferably, the weight ratio of the rhodium-containing catalyst to the co-catalyst is furthermore in the range from 1:3 to 1:55, particularly preferably in the range from 1:5 to 1:45, relative to 100 parts by weight of the nitrile rubber to be hydrogenated. Suitably, 0.1 to 33 parts by weight of the co-catalyst, preferably 0.5 to 20 and very particularly preferably 1 to 5 parts by weight, especially more than 2 but less than 5 parts by weight of co-catalyst are employed, based on 100 parts by weight of the nitrile rubber to be hydrogenated.

The practical implementation of this hydrogenation is known from U.S. Pat. No. 6,683,136. It customarily takes place by pressurizing the nitrile rubber to be hydrogenated with hydrogen in a solvent such as toluene or monochlorobenzene at a temperature in the range from 100 to 150° C. and a pressure in the range from 50 to 150 bar for 2 to 10 h.

Hydrogenation or "hydrogenates" is understood in the context of this invention as meaning a reaction of the C=C double bonds present in the starting nitrile rubber to at least 50%, preferably 70-100%, particularly preferably 80-100%.

When using heterogeneous catalysts, these are customarily supported catalysts based on palladium, which are supported, for example, on carbon, silica, calcium carbonate or barium sulphate.

The invention also relates to hydroxyl group-containing HNBR rubbers characterized by repeating units exclusively derived from (i) one or more conjugated dienes, (ii) one or more α,β-unsaturated nitriles and (iii) one or more copolymerizable hydroxyl group-containing monomers in each case containing at least one hydroxyl group, which is not bound to the C atom of a carboxyl group, to which furthermore an oxygen atom is bonded by double bonding.

The subject of the invention is furthermore vulcanizable compositions containing at least one optionally hydrogenated hydroxyl group-containing nitrile rubber and at least one cross-linker of the general formula (I), (II), (III) or (IV), which contains at least two isocyanate groups. Optionally, these vulcanizable compositions contain at least one further cross-linker, which is different from those of the general formulae (I) to (IV).

The amount of the cross-linker of the general formula (I), (II), (III) or (IV) or (I-1) to (I-6), which contains at least two isocyanate groups, is customarily in the range from 0.2 to 25 phr, preferably from 1 to 20 phr, particularly preferably in the range from 1.5 to 15 phr and especially in the range from 2 to 10 phr, based on the hydroxyl group-containing optionally hydrogenated nitrile rubber. Within the meaning of the invention, "phr" here means "parts per hundred parts of rubber", where "rubber" is synonymous with the hydroxyl group-containing optionally hydrogenated nitrile rubber.

Customarily, the vulcanizable compositions according to the invention contain at least 33% by weight, preferably at least 35% by weight, particularly preferably at least 40% by weight of the hydroxyl group-containing (H)NBR rubber, based on the weight of the total composition. Embodiments are also possible in which the vulcanizable composition contains a proportion of the hydroxyl group-containing (H)NBR rubber of at least 42% by weight, especially at least 45% by weight based on the weight of the total composition.

More reliably, the vulcanizable compositions according to the invention based on the hydroxyl group-containing (H)NBR rubber contain no solvent at all or only a small amount of solvent. Vulcanizable compositions have proven suitable, for example, which contain not more than 15% by weight of solvent, preferably not more than 10% by weight, particularly preferably not more than 5% by weight, very particularly preferably not more than 2% by weight and especially preferably not more than 1% by weight of solvent, in each case based on the hydroxyl group-containing (H)NBR rubber. "Solvents" are here in turn to be understood as meaning water, any organic solvents and any other substances that dissolve hydroxyl group-containing (H)NBR rubber, or any desired mixtures of the aforementioned.

Particularly preferably, the vulcanizable compositions according to the invention contain only the aforementioned maximum amounts of water or organic solvents such as methyl acetate, n-butyl acetate, t-butyl acetate, acetone, ethyl acetate, isopropyl acetate, isobutyl acetate, tetrahydrofuran, N-methylpyrrolidone, aliphatic hydrocarbons such as heptane, dimethylformamide, diisobutyl ketone (DIBK), methyl isoamyl ketone, monochlorotoluene, p-chlorobenzotrifluoride (PCBTF), VM&P naphtha, xylene, toluene, MEK and MIBK. In particular, the vulcanizable compositions according to the invention contain only the aforementioned maximum amounts of water or MIBK. This applies equally for the use according to the invention.

The vulcanizable compositions according to the invention are thus not present in liquid form.

Optionally, such vulcanizable compositions can also contain one or more additives familiar to the person skilled in the art for rubbers (for this see Ullmann's Encyclopedia of Industrial Chemistry, VCH Verlagsgesellschaft mbH, D-69451 Weinheim, 1993, Vol A 23 "Chemicals and Additives", pp. 366-417). These comprise anti-ageing agents, reversion retardants, photoprotective agents, ozone protectants, processing aids, reinforcing materials, mould release agents, plasticizers, mineral oils, tackifiers, propellants, colorants, pigments, waxes, resins, extenders, organic acids, vulcanization retardants, metal oxides, fillers and filler activators.

Possible further cross-linkers that can be used, which are different from the compounds of the general formulae (I)-(IV), are, for example, peroxides, sulphur or sulphur donors. Suitable peroxides are bis(2,4-dichlorobenzyl) peroxide, dibenzoyl peroxide, bis(4-chlorobenzoyl) peroxide, 1,1-bis(t-butylperoxy)-3,3,5-trimethylcylohexane, tert-butyl perbenzoate, 2,2-bis(t-butyl-peroxy)butene, 4,4-di-tert-butyl peroxynonylvalerate, dicumyl peroxide, 2,5-dimethyl-2,5-di(t-butylperoxy)hexane, tert-butylcumyl peroxide, 1,3-bis(t-butylperoxyisopropyl)benzene, di-t-butyl peroxide and 2,5-dimethyl-2,5-di(t-butylperoxy)hex-3-yne.

It can be advantageous, in addition to these peroxide cross-linkers, to additionally use further additives, with the aid of which the cross-linking yield can be increased: triallyl isocyanurate, triallyl cyanurate, trimethylolpropane tri(meth)acrylate, triallyl trimellitate, ethylene glycol dimethacrylate, butanediol dimethacrylate, trimethylolpropane trimethacrylate, zinc acrylate, zinc diacrylate, zinc methacrylate, zinc dimethacrylate, 1,2-polybutadiene or N,N'-m-phenylenedimaleimide, for example, are suitable for this.

As further cross-linkers, sulphur in elementary soluble or insoluble form or sulphur donors can also be employed. Possible sulphur donors are, for example, dimorpholyl disulphide (DTDM), 2-morpholinodithiobenzothiazole (MBSS), caprolactam disulphide, dipentamethylenethiuram tetrasulphide (DPTT), and tetramethylthiuram disulphide (TMTD). If sulphur or a sulphur donor is added as a further cross-linker, under certain circumstances it is advisable to use yet further additives, with the aid of which the cross-linking yield can be increased. Fundamentally the cross-linkage, however, can also be carried out with sulphur or sulphur donors as the only further cross-linker in addition to the cross-linkers of the general formulae (I) to (IV) to be employed according to the invention.

Conversely, the cross-linkage of the hydroxyl group-containing optionally hydrogenated nitrile rubbers, however, can also be carried out only in the presence of the abovementioned additives, i.e. without addition of elementary sulphur or sulphur donors, but of course furthermore in the presence at least of a cross-linker of the general formulae (I) to (IV).

Suitable additives with the aid of which the cross-linking yield can be increased on the additional use of sulphur or sulphur donors are, for example, dithiocarbamates, thiurams, thiazoles, sulphenamides, xanthates, bi- or polycyclic amines, guanidine derivatives, dithiophosphates, caprolactams and thiourea derivatives.

Dithiocarbamates that can be employed are, for example: ammonium dimethyldithiocarbamate, sodium diethyldithiocarbamate (SDEC), sodium dibutyldithiocarbamate (SDBC), zinc dimethyldithiocarbamate (ZDMC), zinc diethyldithiocarbamate (ZDEC), zinc dibutyldithiocarbamate (ZDBC), zinc ethylphenyldithiocarbamate (ZEPC), zinc dibenzyldithiocarbamate (ZBEC), zinc penta-methylenedithiocarbamate (Z5MC), tellurium diethyldithiocarbamate, nickel dibutyldithiocarbamate, nickel dimethyldithiocarbamate and zinc diisononyldithiocarbamate.

Thiurams that can be employed are, for example: tetraethylthiuram disulphide (TMTD), tetramethylthiuram monosulphide (TMTM), dimethyldiphenylthiuram disulphide, tetrabenzylthiuram disulphide, dipentamethylenethiuram tetrasulphide and tetraethylthiuram disulphide (TETD).

Thiazoles that can be employed are, for example: 2-mercaptobenzothiazole (MBT), dibenzothiazyl disulphide (MBTS), zinc mercaptobenzothiazole (ZMBT) and copper 2-mercaptobenzothiazole.

Sulfenamide derivatives that can be employed are, for example: N-cyclohexyl-2-benzothiazylsulphenamide (CBS), N-tert-butyl-2-benzothiazylsulphenamide (TBBS), N,N'-dicyclohexyl-2-benzothiazylsulphenamide (DCBS), 2-morpholinothiobenzothiazole (MBS), N-oxydiethylenethiocarbamyl-N-tert-butylsulphenamide and oxydiethylenethiocarbamyl-N-oxyethylenesulphenamide.

Xanthates that can be employed are, for example: sodium dibutylxanthate, zinc isopropyldibutylxanthate and zinc dibutylxanthate.

Bi- or polycyclic amines that can be employed are, for example: 1,8-diazabicyclo[5.4.0]undec-7-ene (DBU), 1,5-diazabicyclo[4.3.0]non-5-ene (DBN), 1,4-diazabicyclo[2.2.2]octane (DABCO), 1,5,7-triazabicyclo[4.4.0]dec-5-ene (TBD) and 7-methyl-1,5,7-triazabicyclo[4.4.0]dec-5-ene.

Guanidine derivatives that can be employed are, for example: diphenylguanidine (DPG), di-o-tolylguanidine (DOTG) and o-tolylbiguanide (OTBG).

Dithiophosphates that can be employed are, for example: zinc dialkydithiophosphate (chain length of the alkyl radicals $C_2$ to $C_{16}$), copper dialkyldithiophosphate (chain length of the alkyl radicals $C_2$ to $C_{16}$) and dithiophosphoryl polysulphide.

A caprolactam that can be employed is, for example, dithiobiscaprolactam.

Thiourea derivatives that can be employed are, for example, N,N'-diphenylthiourea (DPTU), diethylthiourea (DETU) and ethylenethiourea (ETU).

Likewise suitable as additives are, for example: zinc diaminediisocyanate, hexamethylenetetramine, 1,3-bis(citraconimidomethyl)benzene and cyclic disulphanes.

With carboxyl- and hydroxyl-containing nitrile rubbers, a further cross-linking method that can be used is a polyaminic cross-linking method, where the polyamines used contain at least 2 amino groups, or these are formed in-situ during the vulcanization. Polyamines that can be used are, for example, aliphatic polyamines, such as hexamethylenediamine, hexamethylenediamine carbamate, hexamethylenediamine-cinnamaldehyde adducts or hexamethylenediamine dibenzoate salts or aromatic polyamines such as 2,2-bis(4-(4-aminophenoxy)phenyl)propane, 4,4'-methylenedianiline, m-phenylenediamine, p-phenylenediamine or 4,4'-methylenebis(o-chloroaniline). Reagents that contain at least 2 hydrazide units, such as isophthalic dihydrazide, adipic dihydrazide or sebacic dihydrazide, are likewise suitable.

The additives mentioned as well as the cross-linking agents can be employed individually or alternatively in mixtures. The following additional substances are preferably employed for the cross-linkage of the optionally hydrogenated hydroxyl group-containing nitrile rubbers: sulphur, 2-mercaptobenzothiazole, tetramethylthiuram disulphide, tetramethylthiuram monosulphide, zinc dibenzyldithiocarbamate, dipentamethylenethiuram tetrasulphide, zinc dialkydithiophosphate, dimorpholyl disulphide, tellurium diethyldithiocarbamate, nickel dibutyldithiocarbamate, zinc dibutyldithiocarbamate, zinc dimethyldithiocarbamate and dithiobiscaprolactam.

In addition, premature vulcanization retardants can also be employed for additional cross-linkages. These include cyclohexylthiophthalimide (CTP), N,N'-dinitrosopentamethylenetetramine (DNPT), phthalic anhydride (PTA) and diphenylnitrosamine. Cyclohexylthiophthalimide (CTP) is preferred.

During cross-linking, it is optionally also useful to additionally use still further inorganic and/or organic substances, e.g. zinc oxide, zinc carbonate, lead oxide, magnesium oxide, saturated or unsaturated organic fatty acids and their zinc salts, polyalcohols, aminoalcohols, e.g. triethanolamine and also amines, e.g. dibutylamine, dicyclohexylamine, cyclohexylethylamine and polyetheramines.

Preferably, in addition to at least one compound of the general formula (I)-(IV) no or only insignificant amounts of further cross-linkers are employed in the vulcanizable composition. If further cross-linkers are employed, the total amount of all cross-linkers present in the vulcanizable composition (i.e. that according to the invention of the general formula (I)-(IV) plus further cross-linkers) including additives increasing the cross-linking yield and also premature vulcanization retardants is generally in the range from 0.5 to 30 phr, preferably 1 to 23, particularly preferably 1.5 to 18 phr, very particularly preferably 2 to 15 phr and especially 3 to 12 phr, based on the hydroxyl group-containing optionally hydrogenated nitrile rubber.

In a preferred embodiment, vulcanizable compositions are concerned that additionally contain at least one filler.

Fillers that can be employed are, for example, carbon black, silica, barium sulphate, titanium dioxide, zinc oxide, calcium oxide, calcium carbonate, magnesium oxide, aluminium oxide, iron oxide, aluminium hydroxide, magnesium hydroxide, aluminium silicates, diatomaceous earth, talc, kaolins, bentonites, carbon nanotubes, Teflon (the latter preferably in powder form), or silicates.

Possible filler activators are especially organic silanes, such as, for example, vinyltrimethyloxysilane, vinyldimethoxymethylsilane, vinyltriethoxysilane, vinyltris(2-methoxy-ethoxy)silane, N-cyclohexyl-3-aminopropyltrimethoxysilane, 3-aminopropyltrimethoxysilane, methyltrimethoxysilane, methyltriethoxysilane, dimethyldimethoxysilane, dimethyldiethoxysilane, trimethylethoxysilane, isooctyltrimethoxysilane, isooctyltriethoxysilane, hexadecyltrimethoxy-silane or (octadecyl)methyldimethoxysilane. Further filler activators are triethanolamine, trimethylolpropane, hexanetriol or polyethylene glycols having molecular weights of 74 to 10 000 g/mol. The amount of filler activators is customarily 0 to 10 phr, based on 100 phr of the optionally hydrogenated nitrile rubber.

Anti-ageing agents that can be added are phenolic, aminic and also other anti-ageing agents.

Suitable phenolic anti-ageing agents are alkylated phenols, styrenized phenol, sterically hindered phenols such as 2,6-di-tert-butylphenol, 2,6-di-tert-butyl-p-cresol (BHT), 2,6-di-tert-butyl-4-ethylphenol, ester group-containing sterically hindered phenols, thioether-containing sterically hindered phenols, 2,2'-methylenebis(4-methyl-6-tert-butylphenol) (BPH) and sterically hindered thiobisphenols.

If discoloration of the rubber does not matter, aminic anti-ageing agents, e.g. mixtures of diaryl-p-phenylenediamines (DTPD), octylated diphenylamine (ODPA), phenyl-α-naphthylamine (PAN), phenyl-β-naphthylamine (PBN), preferably those based on phenylenediamine, are also employed. Examples of phenylenediamines are N-isopropyl-N'-phenyl-p-phenylenediamine, N-1,3-dimethyl-butyl-N'-phenyl-p-phenylenediamine (6PPD), N-1,4-dimethylpentyl-N'-phenyl-p-phenylenediamine (7PPD), N,N'-bis-1,4-(1,4-dimethylpentyl)-p-phenylenediamine (77PD) etc.

The other anti-ageing agents include phosphites such as tris(nonylphenyl) phosphite, polymerized 2,2,4-trimethyl-1,2-dihydroquinoline (TMQ), 2-mercaptobenzimidazole (MBI), methyl-2-mercaptobenzimidazole (MMBI), zinc methylmercaptobenzimidazole (ZMMBI). The phosphites are in general employed in combination with phenolic anti-ageing agents. TMQ, MBI and MMBI are especially used for NBR types, which in addition to the isocyanate cross-linkage are additionally peroxidically vulcanized.

Possible mould release agents are, for example: Saturated and partially unsaturated fatty acids and oleic acids and their derivatives (fatty acid esters, fatty acid salts, fatty alcohols, fatty acid amides), which are preferably used as a component of the mixture, furthermore products that can be applied to the mould surface, such as, for example, products based on low molecular weight silicone compounds, products based on fluoropolymers, and products based on phenolic resins. The mould release agents are employed as a component of the mixture in amounts from about 0 to 10 phr, preferably 0.5 to 5 phr, based on 100 phr of the hydroxyl group-containing optionally hydrogenated nitrile rubber.

Strengthening with reinforcing materials (fibres) made of glass, according to the teaching of U.S. Pat. No. 4,826,721 is possible as well as strengthening by cords, fabric, fibres of aliphatic and aromatic polyamides (Nylon®, Aramid®), polyesters and natural fibre products.

The nitrile rubber composition according to the invention is preferably free of tin-containing compounds.

The subject of the present invention is furthermore a process for the production of the vulcanizable compositions by blending the ingredients and a process for the production of vulcanizates, characterized in that the aforementioned composition is cross-linked with heating, and the vulcanizates thus obtainable. The production of the compositions and their cross-linkage can be carried out by customary processes.

EXAMPLES

The nitrogen content for the determination of the acrylonitrile content (ACN content) is determined in the optionally hydrogenated hydroxyl group-containing nitrile rubbers according to the invention according to Kjeldahl in accordance with DIN 53 625. On account of the content of polar comonomers, the nitrile rubbers are customarily soluble to >85% by weight in methyl ethyl ketone at 20° C.

The determination of the glass transition temperature, and its onset and offset points is carried out by means of dynamic differential calorimetry (Differential Scanning Calorimetry—DSC) according to ASTM E 1356-03 or according to DIN 11357-2.

The determination of the microstructure and the termonomer content of the individual polymers was carried out by means of $^1$H NMR (apparatus: Bruker DPX400 with XWIN-NMR 3.1 software, measuring frequency 400 MHz, solvent CDCl$_3$).

The determination of the values for the Mooney viscosity (ML 1+4@ 100° C.) is in each case carried out by means of a shearing disc viscometer according to DIN 53523/3 or ASTM D 1646 at 100° C.

The determination of the MSR (Mooney Stress Relaxation) is in each case carried out by means of a shearing disc viscometer according to ISO 289-4:2003(E) at 100° C.

The course of vulcanization in the MDR and its analytical data were measured on a Monsanto rheometer MDR 2000 according to ASTM D5289-95.

The compression set (CS) at the specified temperature was measured according to DIN 53517.

The hardness according to Shore A was measured according to ASTM-D2240-81.

The tensile tests for the determination of the tension as a function of the deformation were carried out according to DIN 53504 or ASTM D412-80.

The abbreviations indicated in the following tables have the following meanings:

"RT" Room temperature (23±2° C.)
"TS" Tensile strength, measured at RT
"EB" Elongation at break, measured at RT
"M50" Modulus at 50% extension, measured at RT
"M100" Modulus at 100% extension, measured at RT
"M300" Modulus at 300% extension, measured at RT
"S min" is the minimum moment of rotation of the cross-linkage isotherm
"S max" is the maximum moment of rotation of the cross-linkage isotherm
"Delta S" is equal to "S max–S min"
"$t_{10}$" is the time when 10% of S max is achieved
"$t_{50}$" is the time when 50% of S max is achieved
"$t_{90}$" is the time when 90% of S max is achieved
"$t_{95}$" is the time when 95% of S max is achieved
"TS2" denotes the time until the Mooney viscosity has increased by two units in comparison to the starting point The Following Substances were Employed in the Examples:

The following chemicals were obtained as commercial products of the firms indicated in each case or originate from production plants of the firms indicated.

Addolink® TT dimeric tolylene diisocyanate with uretdione structure (commercial product of Rheinchemie Rheinau GmbH)
Corax® N550/30 carbon black (commercial product of Evonik Degussa)
Desmodu® N3300 trimeric hexamethylene diisocyanate with cyanurate structures (commercial product of Bayer Material Science AG)
Diplast® TM 8-10/ST trioctyl mellitate (commercial product of Lonza SpA)
TAIC 70 triallyl isocyanurate (commercial product of Ketlitz Chemie GmbH & Co.)
Luvomaxx® CDPA p-dicumyldiphenylamine (commercial product of Lehmann & Voss)
Maglite® DE magnesium oxide (commercial product of HallStar Company)
Winstay® 29/Naugawhite mixture: mixture of 25 g of Sorbilene Mix (mixture of sorbitan esters and ethoxylated sorbitan esters) from Lamberti, 38 g of Naughawhite (2,2'-methylenebis(6-nonyl-p-cresol)) from Chemtura, 125 g of Wingstay® 29 (styrenized diphenylamine) from the company Eliokem and 63 g of water
PERKADOX® 14-40 di(tert-butylperoxyisopropyl)benzene supported on silica& whiting (40% active ingredient) (commercial product of Akzo Nobel Chemicals GmbH)
"Premix solution Fe(II)SO$_4$" contains 0.986 g of Fe(II)SO$_4$.7 H$_2$O and 2.0 g of Rongalit®C in 400 g of water
Rongalit C® sodium salt of a sulphinic acid derivative (commercial product of BASF SE)
t-DDM: tertiary dodecylmercaptan; LANXESS Deutschland GmbH
Texapon® K-12: sodium laurylsulphate (commercial product of Cognis GmbH)
Trigonox® NT 50 p-menthane hydroperoxide (commercial product of Akzo-Degussa)
Vulcanox® ZMB2/C5: zinc salt of 4- and 5-methyl-2-mercaptobenzimidazole (commercial product of LANXESS Deutschland GmbH)

I Production of the Nitrile Rubbers A, B, C (Examples According to the Invention)

The production of the nitrile rubbers A, B, C employed in the following example series was carried out according to the basic recipe indicated in Table 1, where all materials used are indicated in parts by weight based on 100 parts by weight of the monomer mixture. Table 1 also mentions the respective polymerization conditions.

TABLE 1

|  | Nitrile rubber | | |
|---|---|---|---|
|  | A | B | C |
| Butadiene | 59.0 | 56.5 | 56.1 |
| Acrylonitrile | 36.0 | 36.0 | 35.5 |
| 2-Hydroxethyl methacrylate (HEMA) | 5 | 7.5 | — |
| 2-Hydroxethyl acrylate (HEA) | — | — | 8.4 |
| Total amount of water | 220 | 220 | 220 |
| Texapon ® K-12 | 3.0 | 3.0 | 3.0 |
| Na$_2$SO$_4$ | 0.12 | 0.12 | 0.12 |
| pH | 7 | 7 | 7 |
| t-DDM | 0.54 | 0.52 | 0.56 |
| Trigonox ® NT 50 | 0.02 | 0.02 | 0.02 |
| Premix solution FeSO$_4$ | 0.03 | 0.03 | 0.07 |
| Diethylhydroxylamine | 0.2 | 0.2 | 0.2 |
| Mixture Winstay ® 29/Naugawhite | 0.18 | 0.18 | 0.18 |
| Polymerization temperature [° C.] | 8.0 ± 0.5 | 8.0 ± 0.5 | 8.0 ± 0.5 |
| Polymerization conversion [%] | 85 | 84 | 83 |
| Polymerization time [h] | 6.0 | 5.5 | 10.0 |

The production of the nitrile rubbers was carried out batchwise in a 5 l autoclave having a stirrer. In each case 1.25 kg of the monomer mixture and a total amount of water of 2.1 kg and EDTA in an equimolar amount based on the Fe-II were used in the autoclave batches. Of this amount of water, 1.9 kg were initially introduced into the autoclave with the emulsifier and flushed with a stream of nitrogen. The destabilized monomers and the amount of the molecular weight regulator t-DDM indicated in Table 1 were then added, and the reactor was closed. After thermostatting the reactor contents, the polymerizations were started by the addition of the premix solutions and of para-menthane hydroperoxide (Trigonox®NT50).

The course of the polymerization was monitored by gravimetric conversion determinations. On achieving the conversions indicated in Table 1, the polymerization was halted by addition of an aqueous solution of diethylhydroxylamine. Unreacted monomers and other volatile constituents were removed by means of steam distillation.

The dried NBR rubbers were characterized by the Mooney viscosity, their MSR, the ACN content and the glass transition temperature and the content of the hydroxyl group-containing termonomer was determined by $^1$H-NMR analysis (Table 2).

TABLE 2

Nitrile rubbers A, B, C; properties

|  | Nitrile rubber | | |
|---|---|---|---|
|  | A | B | C |
| ACN content (%) | 34.1 | 34.1 | 35.3 |
| Mooney viscosity ML(1 + 4 at 100° C.) (Mu) | 27 | 30 | 28 |
| MSR (Mu/s) | 0.653 | 0.626 | 0.591 |
| Termonomer | HEMA | HEMA | HEA |
| Incorporation of Termonomer (% by weight) | 2.9 | 4.8 | 2.0 |
| Glass transition temperature $T_g$ (° C.) | 21.6 | 20.3 | 23.4 |

II Production of Vulcanizates V1 to V9 of the Nitrile Rubbers A, B, C (Examples According to the Invention)

The vulcanizates V1 to V9 were prepared from the nitrile rubbers A, B and C as described below. The constituents of the mixtures are related to 100 parts of nitrile rubber and indicated in the Tables 3, 7 and 11.

The mixtures were prepared in a Banbury mixer. For this, the rubber and all additives mentioned in Table 3, 7 or 11 were mixed for a total of 4 minutes at a maximum temperature of up to 120° C. The rubber was introduced into the mixer for this, after 1 minute all other additives were added and after a further 2 minutes a reverse direction step was carried out. After a total of 4 minutes, the rubber was discharged from the mixer. The compound was vulcanized at a temperature of 170° C. for 30 min.

TABLE 3

Vulcanizates V1-V3; composition

|  |  | Mixture | | |
|---|---|---|---|---|
|  |  | V1 | V2 | V3 |
| Polymer A |  | 100 |  |  |
| Polymer B |  |  | 100 |  |
| Polymer C |  |  |  | 100 |
| LUVOMAXX ® CDPA |  | 1 | 1 | 1 |
| VULKANOX ® ZMB2/C5 |  | 0.4 | 0.4 | 0.4 |
| MAGLITE ® DE |  | 2 | 2 | 2 |
| CORAX ® N 550/30 |  | 50 | 50 | 50 |
| DIPLAST ® TM 8-10/ST |  | 5 | 5 | 5 |
| ADDOLINK ® TT |  | 8 | 8 | 8 |
| Total | phr | 166.4 | 166.4 | 166.4 |
| Density | g/ccm | 1.162 | 1.162 | 1.162 |

The vulcanizates obtained had the properties indicated in Tables 4 to 6:

TABLE 4

Vulcanizates V1-V3; vulcanization course in the MDR (170° C./30 min)

|  | Mixture | | |
|---|---|---|---|
|  | V1 | V2 | V3 |
| S max (dNm) | 30.5 | 41.9 | 23.5 |
| $t_{10}$ (min) | 1.0 | 1.0 | 1.0 |
| $t_{95}$ (min) | 11.7 | 14.2 | 13.5 |

The level of the respective maximum torque is according to the proportions of hydroxyl-containing monomers in the polymers A-C. All cross-linkage were carried out without the addition of heavy metal compounds as catalyst, such as, for example, organic tin compounds.

TABLE 5

Vulcanizates V1-V3; vulcanizate properties

|  |  |  | Mixture | | |
|---|---|---|---|---|---|
|  |  |  | V1 | V2 | V3 |
| Cross-linkage temperature | ° C. | 170 |  |  |  |
| Cross-linkage time | min |  | 12 | 13 | 13 |
| TS | MPa |  | 24.7 | 23 | 14.5 |
| EB | % |  | 259 | 171 | 144 |
| M50 | MPa |  | 3.3 | 4.4 | 3.4 |
| M100 | MPa |  | 8.5 | 12 | 9 |
| M300 | MPa |  |  |  |  |
| Hardness | Shore A |  | 74 | 78 | 75 |

The polymers according to the invention are distinguished in their vulcanizates by a high tensile strength and very high modulus values at 100% extension.

TABLE 6

Vulcanizates V1-V3; compression set measured at RT and 100° C.

|  |  | Mixture | | |
|---|---|---|---|---|
|  |  | V1 | V2 | V3 |
| Temperature and time: RT and 24 hours | | | | |
| CS | % | 4 | 3 | 6 |
| Temperature and time: 100° C. and 24 hours | | | | |
| CS | % | 30 | 160 | 32 |

As a result of the relationship between cross-linker and hydroxyl-containing termonomer, elongation at break and maximum torque in the vulcanizate can be adjusted without problem with a simultaneously good compression set.

TABLE 7

Vulcanizates V4-V7; composition

|  |  | Mixture | | | |
|---|---|---|---|---|---|
|  |  | V4 | V5 | V6 | V7 |
| Polymer A |  | 100 | 100 |  |  |
| Polymer B |  |  |  | 100 | 100 |
| LUVOMAXX ® CDPA |  | 1 | 1 | 1 | 1 |
| VULKANOX ® ZMB2/C5 |  | 0.4 | 0.4 | 0.4 | 0.4 |
| MAGLITE ® DE |  | 2 | 2 | 2 | 2 |
| CORAX ® N 550/30 |  | 50 | 50 | 50 | 50 |
| DIPLAST ® TM 8-10/ST |  | 5 | 5 | 5 | 5 |
| ADDOLINK ® TT |  | 4 | 6 | 4 | 6 |
| Total | phr | 162.4 | 164.4 | 162.4 | 164.4 |
| Density | g/ccm | 1.156 | 1.159 | 1.156 | 1.159 |

The vulcanizates obtained had the properties indicated in the Tables 8 to 10:

TABLE 8

Vulcanizates V4-V7M; vulcanization course in the MDR (170° C./30 min)

|  |  | Mixture | | | |
|---|---|---|---|---|---|
|  |  | V4 | V5 | V6 | V7 |
| S max | (dNm) | 17.6 | 29.4 | 21.5 | 32.8 |
| $t_{10}$ | (min) | 1.2 | 1.2 | 1.1 | 1.0 |
| $t_{95}$ | (min) | 14.1 | 17.9 | 12.6 | 12.3 |

The level of the respective maximum torque is according to the proportion of the hydroxyl-containing monomer in the polymers to the ratio of the dimeric diisocyanate. All cross-linkages were carried out without the addition of heavy metal compounds as catalyst, such as, for example, organic tin compounds.

TABLE 9

Vulcanizates V4-V7; properties

|  |  | Mixture | | | |
|---|---|---|---|---|---|
|  |  | V4 | V5 | V6 | V7 |
| Cross-linkage temperature | ° C. | 170 | | | |
| Cross-linkage time | min | 20 | 20 | 20 | 20 |
| TS | MPa | 20.5 | 19.8 | 20 | 19.5 |
| EB | % | 417 | 271 | 336 | 220 |
| M50 | MPa | 2.8 | 4 | 3.3 | 4.6 |
| M100 | MPa | 5.3 | 7.9 | 6.4 | 9.5 |
| M300 | MPa | 15.8 | 21.3 | 18.4 | |
| Hardness | Shore A | 71 | 75 | 72 | 78 |

The polymers according to the invention lead to vulcanizates having high tensile strength and very high modulus values at 100% extension relative to elongation at break.

TABLE 10

Vulcanizates V4-V7; compressive deformation at RT and 100° C.

|  |  | Mixture | | | |
|---|---|---|---|---|---|
|  |  | V4 | V5 | V6 | V7 |
| Temperature and time: RT and 24 hours | | | | | |
| CS | % | 9 | 6 | 6 | 5 |
| Temperature and time: 100° C. and 24 hours | | | | | |
| CS | % | 20 | 23 | 15 | 15 |

In addition to cross-linkages by means of dimeric diisocyanates with uretdione structure, cross-linkages were also carried out with trimeric hexamethylene diisocyanates having cyanurate structures.

TABLE 11

Vulcanizates V8-V9; composition

|  | Mixture | |
|---|---|---|
|  | V8 | V9 |
| Polymer B | 100 | 100 |
| LUVOMAXX ® CDPA | 1 | 1 |
| VULKANOX ® ZMB2/C5 | 0.4 | 0.4 |

TABLE 11-continued

Vulcanizates V8-V9; composition

|  |  | Mixture | |
|---|---|---|---|
|  |  | V8 | V9 |
| MAGLITE ® DE | | 2 | 2 |
| CORAX ® N 550/30 | | 50 | 50 |
| DIPLAST ® TM 8-10/ST | | 5 | 5 |
| Desmodur ® N3300 | | 4 | 6 |
| Total | phr | 162.4 | 164.4 |
| Density | g/ccm | 1.15 | 1.15 |

The vulcanizates obtained had the properties indicated in Tables 12 to 14:

TABLE 12

Vulcanizates V8 and V9; Vulcanization course in the MDR (170° C./40 min)

|  |  | Mixture | |
|---|---|---|---|
|  |  | V8 | V9 |
| S max | (dNm) | 15.6 | 23.3 |
| $t_{10}$ | (min) | 0.5 | 0.5 |
| $t_{95}$ | (min) | 6.2 | 6.9 |

The level of the respective maximum torque is according to the proportions of a cross-linker. All cross-linkages were carried out without the addition of heavy metals as a catalyst, such as, for example, organic tin compounds.

TABLE 13

Vulcanizates V8 and V9; properties

|  |  | Mixture | |
|---|---|---|---|
|  |  | V8 | V9 |
| Cross-linkage temperature | ° C. | 170 | |
| Cross-linkage time | min | 8 | 9 |
| TS | MPa | 16.3 | 17.5 |
| EB | % | 359 | 238 |
| M50 | MPa | 2.1 | 3.1 |
| M100 | MPa | 4.6 | 7.7 |
| M300 | MPa | 14.4 | |
| Hardness | Shore A | 74 | 69 |

TABLE 14

Vulcanizates V8 and V9; compression set at RT, 100° C., 150° C.

|  |  | Mixture | |
|---|---|---|---|
|  |  | V8 | V9 |
| Temperature and time: RT and 24 hours | | | |
| CS | % | 10 | 6 |
| Temperature and time: 100° C. and 24 hours | | | |
| CS | % | 17 | 15 |
| Temperature and time: 150° C. and 24 hours | | | |
| CS | % | 57 | 49 |

The vulcanizates are distinguished by a very low compression set even at unusually high temperatures of 150° C. for NBR.

III Production of Hydrogenated Nitrile Rubbers HNBR 1 and HNBR 2 by Hydrogenation The nitrile rubber "NBR" used as a starting material for the hydrogenation contained repeating units of acrylonitrile, butadiene and with (NBR 1) or without (NBR 2; comparison experiment) a hydroxyl group-containing monomer in the amounts indicated in Table 15 below. It had a Mooney viscosity as indicated in Table 15.

TABLE 15

NBR 1 employed for the hydrogenation (according to the invention) and NBR 2 (comparison)

| NBR | Butadiene content [% by weight] | Termonomer | Termonomer content [% by wt] | ACN content [% by wt] | Mooney viscosity (ML 1 + 4 at 100° C.) |
|---|---|---|---|---|---|
| NBR 1 | 58.3 | Hydroxy-ethylene glycol methacrylate | 5.3 | 36.4 | 34 |
| NBR 2 | 65.5 | — | 0 | 34.5 | 27.4 |

A solution of the NBR 1 or NBR 2 having a solids content of 12% in monochlorobenzene ("MCB") as a solvent was introduced into a high-pressure reactor and heated to 138° C. with stirring at 600 rpm. After adjusting a stable temperature, a solution of 0.06 phr of Wilkinson catalyst and 1.0 phr of triphenylphosphine ("TPP") in MCB was introduced as co-catalyst and hydrogen was introduced into the reactor up to a pressure of 85 bar. The reaction mixture was stirred for 4 hours, whereupon the hydrogen pressure was let off and the reactor was cooled to approximately 22° C. The polymer solution was then discharged from the reactor and coagulated according to known processes using steam. The isolated polymer was subsequently dried.

IV Production of the Vulcanizable Compositions

The components of the vulcanizable composition indicated in Table 16 were mixed in a Banbury mixer by conventional mixing as already described above. The polymer composition was then vulcanized at 180° C. for 20 minutes and temperature-controlled at 175° C. for 4 hours.

The properties of the HNBR vulcanizates, as are reproduced in Tables 17 and 18 and shown in FIG. 1, show the superiority with regard to the cross-linkage density, an increased modulus 100 and the increased tensile strength of HNBR 1 in comparison to HNBR 2. This leads to significant practical advantages in different dynamic applications, such as conveyor belt and sealing applications, where increased dynamic properties of the vulcanizates are demanded.

TABLE 16

Formulation of the vulcanizable compositions, Examples Q1-2

| Rubber component | Q1 Parts | Q2 Parts |
|---|---|---|
| HNBR 1 | 100 | |
| HNBR 2 | | 100 |
| Other components | phr* | phr* |
| CORAX ® N550 | 50 | 50 |
| MAGLITE ® DE | 2 | 2 |
| VULKANOX ® ZMB2/C5 | 0.4 | 0.4 |
| DIPLAST ® TM 8-10/ST | 5 | 5 |
| LUVOMAXX ® CDPA | 1 | 1 |
| ADDOLINK ® TT | 8 | — |
| TAIC 70 | — | 2.1 |
| PERKADOX ® 14-40 | — | 7 |

In Table 16, the amounts of all other components are specified in "phr", i.e. parts by weight per 100 parts of rubber component.

TABLE 17

HNBR vulcanizates Q1 and Q2; physical properties

| | | Q1 | Q2 |
|---|---|---|---|
| Hardness ShA | [Shore A] | 77 | 68 |
| M10 | MPa | 0.9 | 0.6 |
| M25 | MPa | 1.8 | 1.1 |
| M50 | MPa | 3.8 | 1.9 |
| M100 | MPa | 12.1 | 5.0 |
| EB | % | 199 | 236 |
| TS | MPa | 27.6 | 21.4 |

TABLE 18

HNBR vulcanizates Q1 and Q2; MDR values at 180° C.

| | | MDR 180° C. Q1 | Q2 |
|---|---|---|---|
| S min | [dNm] | 5.05 | 1.49 |
| S max | [dNm] | 25.69 | 23.08 |
| Delta S | dNm | 20.64 | 21.59 |
| TS2 | s | 57.6 | 36 |
| t50 | s | 160.35 | 118.13 |
| t90 | s | 393.36 | 329.43 |
| t95 | s | 494.28 | 424.22 |

FIG. 1 shows the MDR at 180° C. for the HNBR vulcanizates of Examples Q1 and Q2. HNBR 1 is the curve running at the top in FIG. 1, the curve of HNBR 2 runs below.

What is claimed is:

1. Vulcanized molded articles produced by a process comprising cross-linking, with warming, a vulcanizable composition comprising:
at least one hydroxyl group-containing (H)NBR rubber having a Mooney viscosity ML(1+4)100° C. of 15 to 160 Mooney units, and containing repeating units derived from at least one conjugated diene, at least one α,β-unsaturated nitrile, and at least one copolymerizable hydroxyl group-containing monomer, wherein C=C double bonds in the case of the HNBR are completely or partially hydrogenated;
at least one compound of the general formula (I) as cross-linkers,

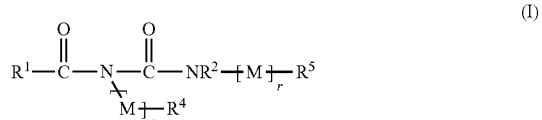

wherein
R¹ is O—[M]$_p$—R³ or NH—[M]$_p$—R³
R² is H
or R¹ and R² together yield a single bond or one of the following groups

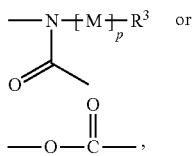 or 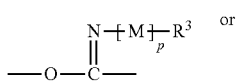 or

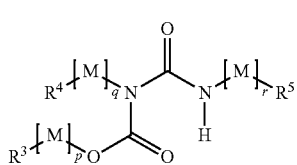

R³, R⁴ and R⁵ are in each case identical or different and denote H or a radical that contains one or more of the following groups, a saturated, mono- or polyunsaturated carbo- or heterocyclyl radical, straight-chain or branched alkyl, aryl, heteroaryl, arylalkyl, heteroarylalkyl, alkoxy, aryloxy, heteroaryloxy, amino, amido, hydroxyimino, carbamoyl, alkoxycarbonyl, F, Cl, Br, I, hydroxyl, phosphonato, phosphinato, alkylthio, arylthio, thiocarboxy, sulphinyl, sulphono, sulphino, sulpheno, sulphonic acids, sulphamoyl, silyl, silyloxy, nitrile, sulphanyl, hydroperoxycarbonyl, hydroperoxy, thiocarboxy, dithiocarboxy, hydroxyimino, nitro, nitrosyl, carbonyl, carboxy, oxycarbonyl, oxysulphonyl, oxo, thioxo, borate, selenate, epoxy, cyanate, thiocyanate, isocyanate, thioisocyanate or isocyanide, M represents repeating units of one or more mono- or polyunsaturated monomers, selected from the group consisting of conjugated or non-conjugated dienes, alkynes, vinyl compounds, and a divalent structural element, which is derived from polymers selected from the group consisting of polyethers, polyalkylene oxides, polysiloxanes, polyols, polycarbonates, polyurethanes, polyisocyanates, polysaccharides, polyesters and polyamides, and p, q and r are identical or different and are 0 to 10,000;
the compounds of the general formula (I) in each case contain at least two isocyanate groups;
the composition contains either no solvents at all, or not more than 15% by weight solvents, based on the hydroxyl group-containing (H)NBR rubber, and the composition is not in liquid form; and
the composition comprises at least one mold-release agent.

2. The vulcanized molded articles according to claim 1, wherein the compounds of the general formula (I) contain at least one allophanate, biuret, uretdione, uretonimine, bridged carbamate, carbodiimide, isocyanurate, iminooxadiazinedione or oxadiazinetrione structure.

3. The vulcanized molded articles according to claim 1, wherein the at least one compound of the general formula (I) comprises one or more compounds of the general formulae (I-1) to (I-6) as cross-linkers, (I-1)

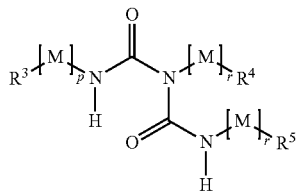

(I-2)

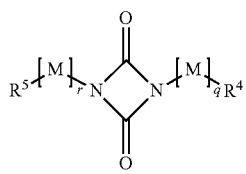

(I-3)

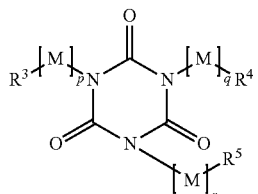

(I-4)

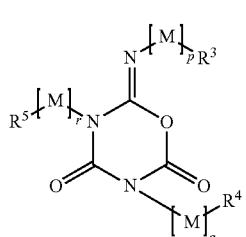

(I-5)

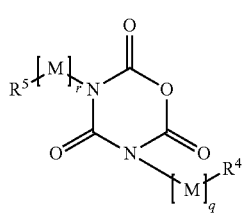

(I-6)

where, in the general formulae (I-1) to (I-6), the radicals R¹, R², R³, R⁴, R⁵ and M and also p, q, r have the same meanings as in claim 1.

4. The vulcanized molded articles according to claim 1, wherein the compound of the general formula (I) is a dimer or trimer of diisocyanates.

5. The vulcanized molded articles according to claim 1, wherein, in the (H)NBR rubber, the copolymerizable hydroxyl group-containing monomer is selected from the group consisting of hydroxyalkyl (meth)acrylates.

6. The vulcanized molded articles according to claim 1, wherein the (H)NBR rubber additionally comprises repeating units of a copolymerizable cross-linking monomer.

7. The vulcanized molded articles according to claim 6, wherein the copolymerizable cross-linking monomer is a triacrylate.

8. The vulcanized molded articles according to claim 1, wherein the composition is free of tin-containing compounds.

9. The vulcanized molded articles according to claim 1, wherein:
the composition contains at least 33% by weight of the hydroxyl group-containing (H)NBR rubber, based on the weight of the total composition;

the composition contains, based on the hydroxyl group-containing (H)NBR rubber, not more than 10% by weight of solvents during and after the mixing, and the (H)NBR rubber composition is produced by mixing the hydroxyl group-containing (H)NBR rubber with the compound of the general formula (I) in the presence of not more than 10% by weight of solvents, based on the hydroxyl group-containing (H)NBR rubber.

10. The vulcanized molded articles according to claim 1, wherein:

the composition contains at least 40% by weight of the hydroxyl group-containing (H)NBR rubber, based on the weight of the total composition, and the Mooney viscosity ML(1+4)100° C. is 25 to 145 Mooney units, and the composition contains, based on the hydroxyl group-containing (H)NBR rubber, not more than 1% by weight of solvents during and after the mixing, and the (H)NBR rubber composition is produced by mixing the hydroxyl group-containing (H)NBR rubber with the compound of the general formula (I) in the presence of not more than 1% by weight of solvents, based on the hydroxyl group-containing (H)NBR rubber.

11. A process for the production of vulcanized molded articles according to claim 1, wherein the process comprises, without predissolving the (H)NBR in a solvent, mixing the (H)NBR rubber and the at least one cross-linker, as is defined in claim 1.

12. The vulcanized molded articles according to claim 1, wherein:

the composition, during and after the mixing, contains not more than 5% by weight solvents, based on the hydroxyl group-containing (H)NBR rubber; and the HNBR rubber and crosslinker are mixed in the presence of not more than 5% by weight of solvents, based on the hydroxyl group-containing (H)NBR rubber.

13. The vulcanized molded articles according to claim 1, wherein:

the composition, during and after the mixing, contains not more than 1% by weight solvents, based on the hydroxyl group-containing (H)NBR rubber; and the HNBR rubber and crosslinker are mixed in the presence of not more than 1% by weight of solvents, based on the hydroxyl group-containing (H)NBR rubber.

14. The vulcanized molded articles according to claim 1, wherein:

the composition contains no solvents at all during and after the mixing; and the HNBR rubber and crosslinker are mixed in the presence of no solvents at all.

\* \* \* \* \*